(12) United States Patent
Baudart et al.

(10) Patent No.: US 6,382,789 B1
(45) Date of Patent: May 7, 2002

(54) TORIC OPHTHALMIC LENSES

(75) Inventors: Thierry Baudart, Joinville le Pont; Gilles Le Saux, Paris, both of (FR)

(73) Assignee: Essilor International, Charenton Cedex (FR)

( * ) Notice: Subject to any disclaimer, the term of this patent is extended or adjusted under 35 U.S.C. 154(b) by 0 days.

(21) Appl. No.: 09/404,556

(22) Filed: Sep. 23, 1999

(30) Foreign Application Priority Data

Sep. 28, 1998 (FR) .............................. 98 12109

(51) Int. Cl.⁷ .............................. G02C 7/02; G02C 7/06
(52) U.S. Cl. .................. 351/177; 351/169; 351/176
(58) Field of Search .................. 351/168, 169, 351/170, 171, 172, 159, 176, 177

(56) References Cited

U.S. PATENT DOCUMENTS

| 4,787,733 A | * 11/1988 | Silva | 351/169 |
| 5,270,745 A | 12/1993 | Pedrono | 351/169 |
| 5,444,503 A | 8/1995 | Kelch et al. | 351/169 |

FOREIGN PATENT DOCUMENTS

| EP | 0 274 179 | 7/1996 |
| EP | 0 857 993 | 8/1998 |

* cited by examiner

*Primary Examiner*—Scott J. Sugarman
(74) *Attorney, Agent, or Firm*—Fish & Richardson P.C.

(57) ABSTRACT

A method is provided for determining, by optimization, an ophthtalmic lens for a spectacle wearer for whom an astigmatism has been prescribed, comprising the steps of:
  selecting a starting lens and defining a working lens to be equal to the starting lens;
  selecting a target lens;
  modifying the working lens, in order to minimize, in a plurality of directions of glance and in a reference frame associated with the eye differences in power between the working lens and the target lens and differences between astigmatism prescribed and astigmatism generated by the working lens.

The invention makes it possible to avoid aberrations introduced, for an astigmatic spectacle wearer, by adding a toric surface having the prescribed astigmatism, thereby ensuring that the astigmatism effectively experienced by the wearer is the prescribed astigmatism.

18 Claims, 22 Drawing Sheets

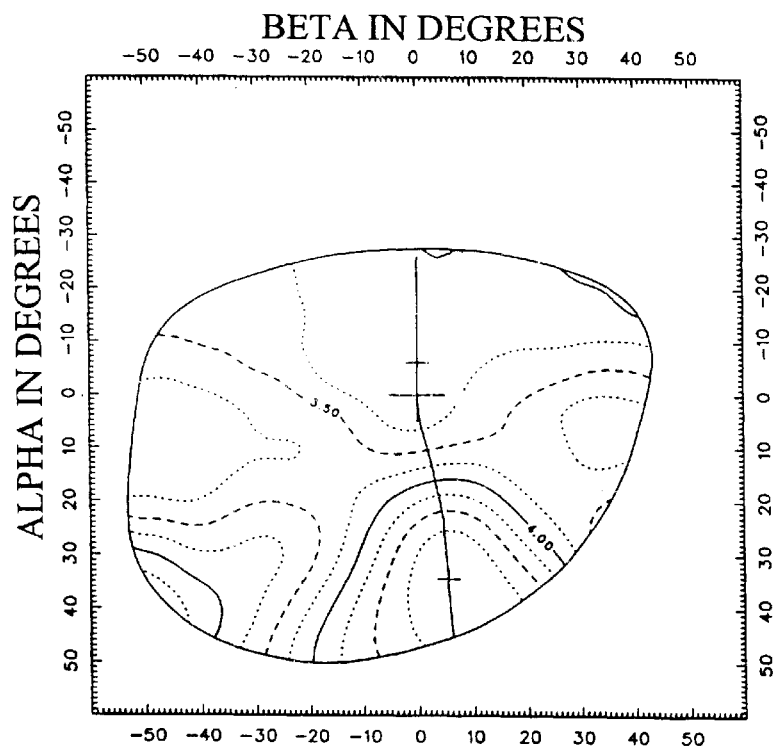
FIG. 12
FIG. 13
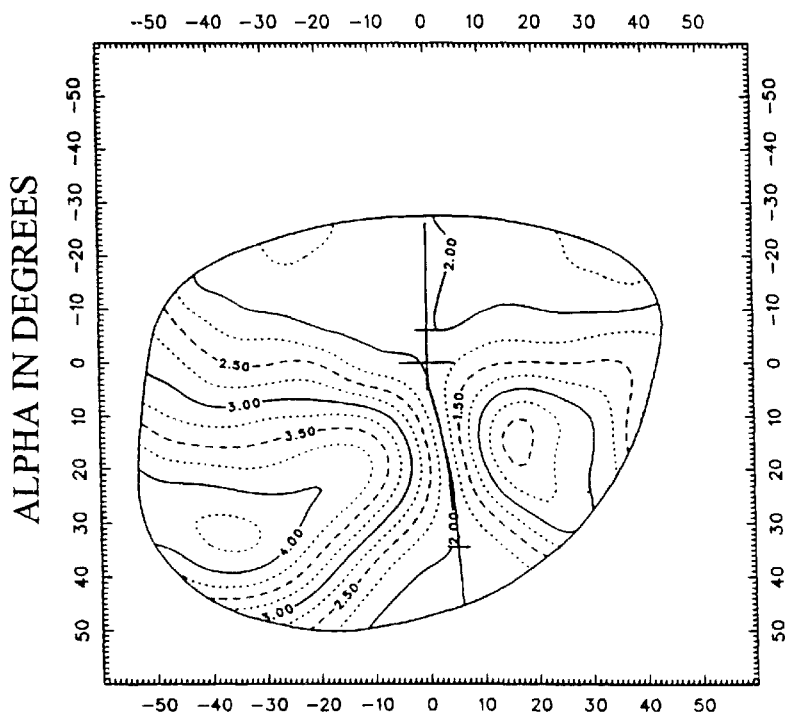

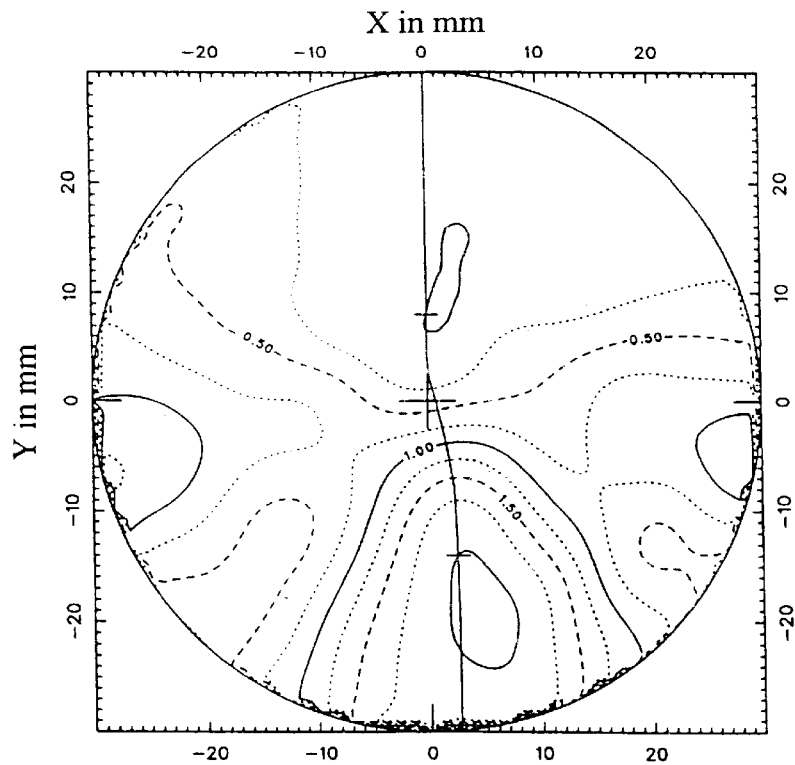
FIG. 16
FIG. 17
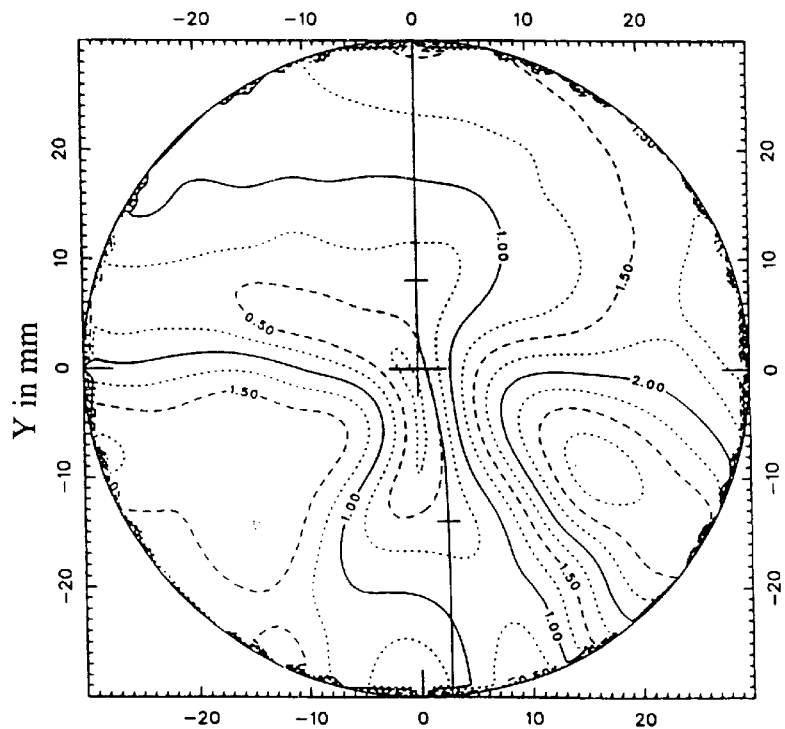

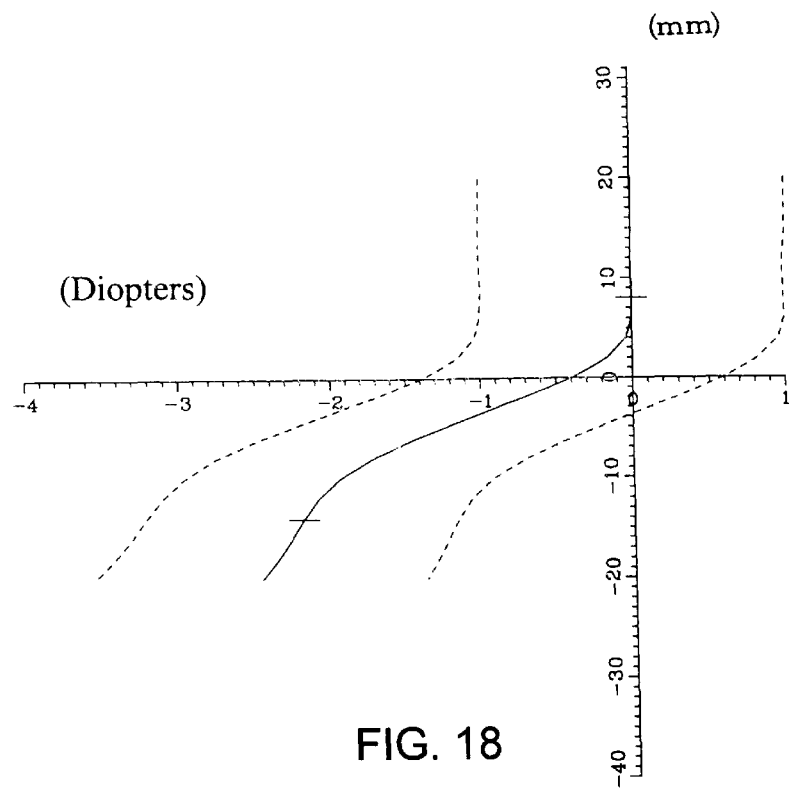
FIG. 18
FIG. 19
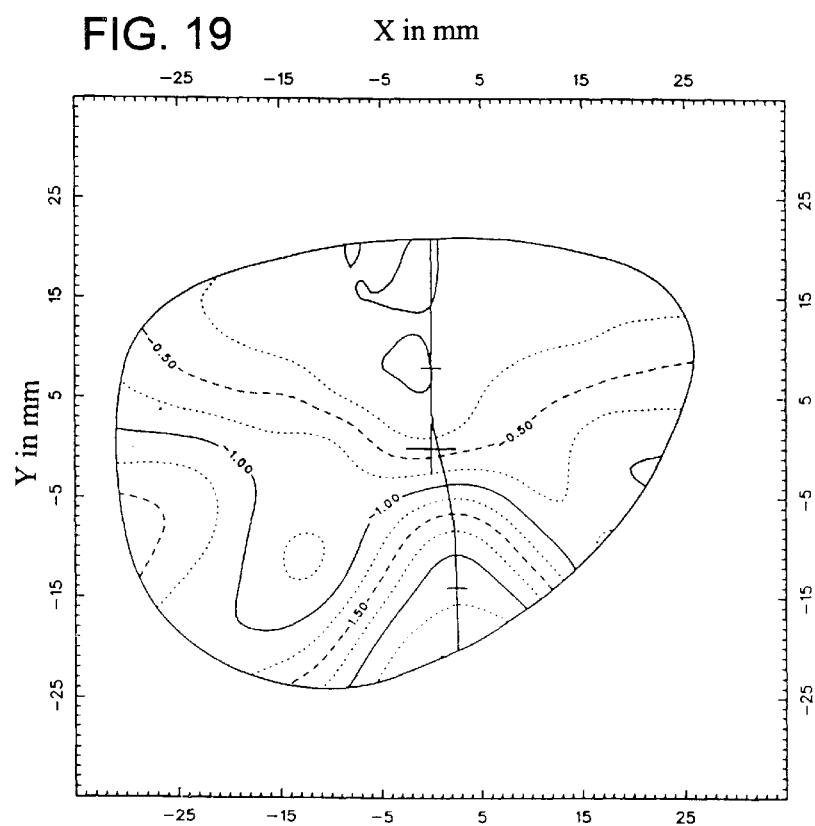

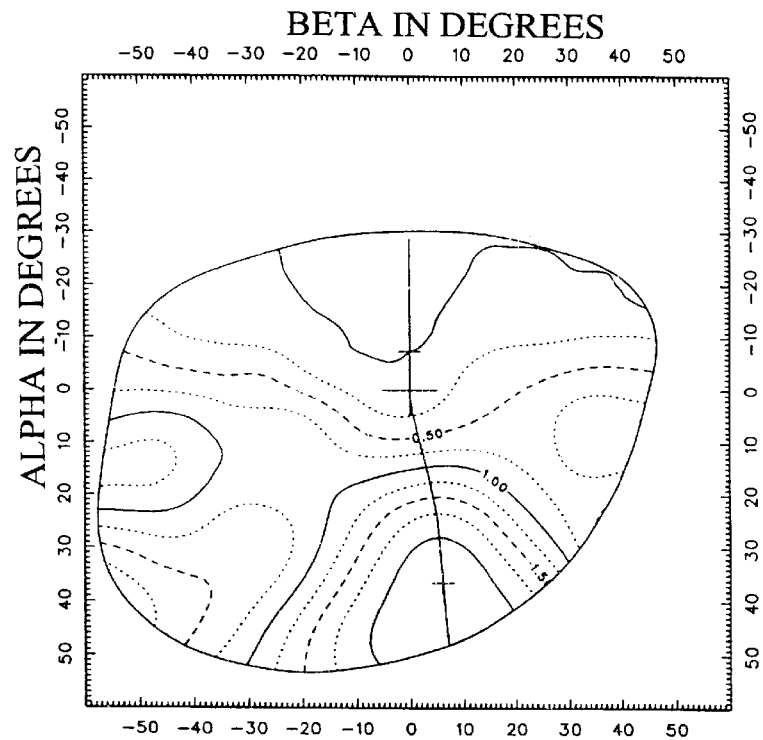
FIG. 22
FIG. 23
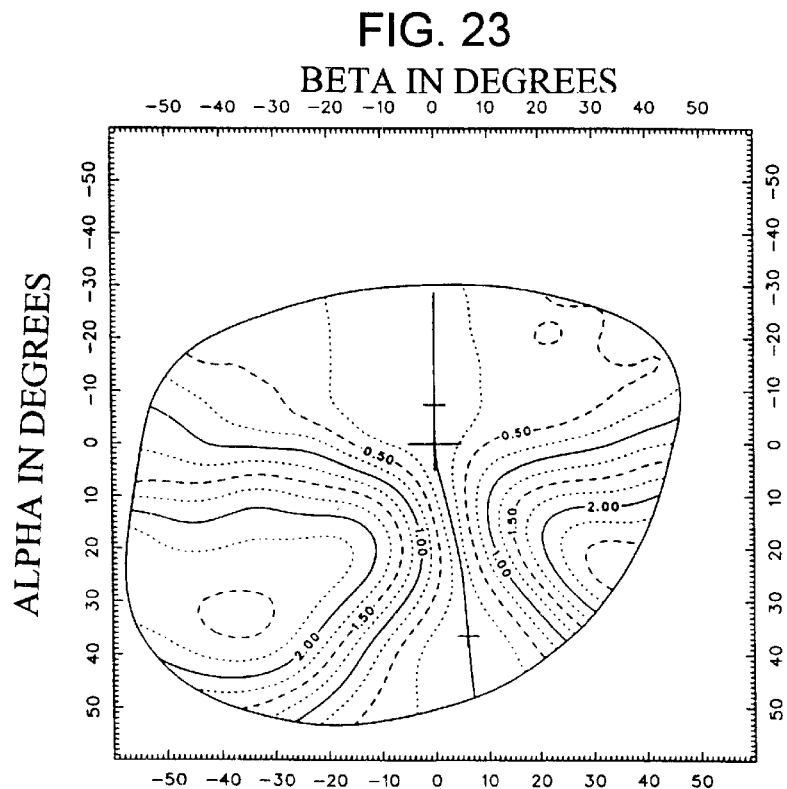

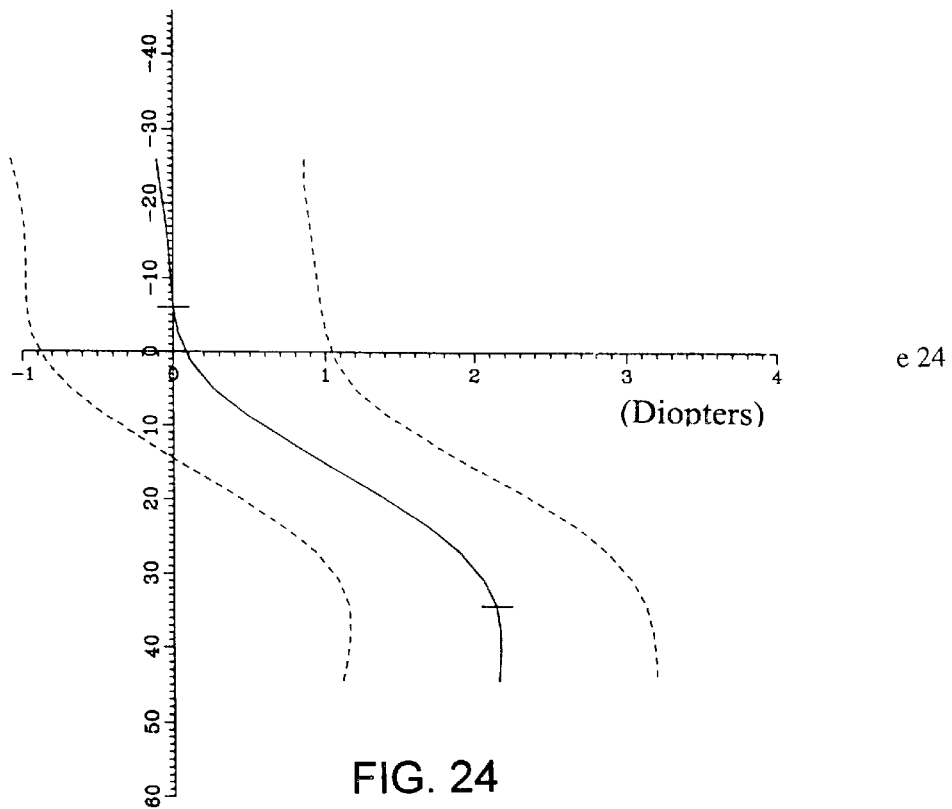
FIG. 24
FIG. 25
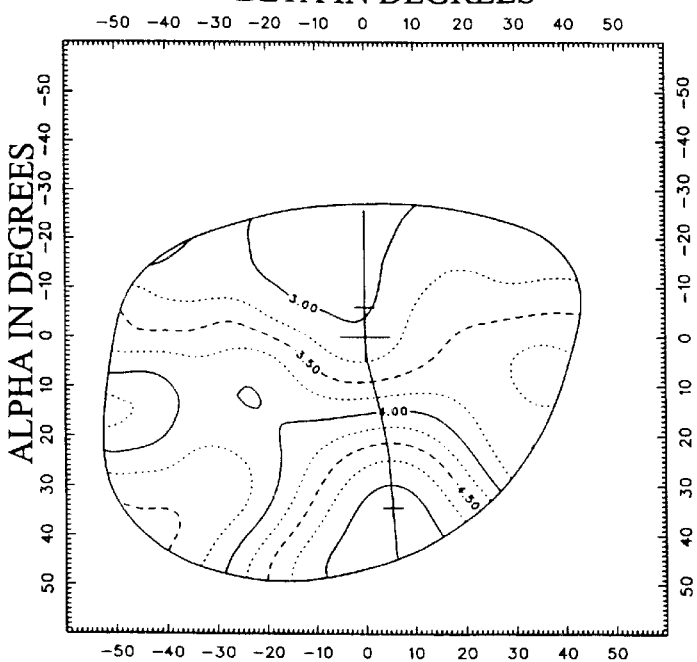

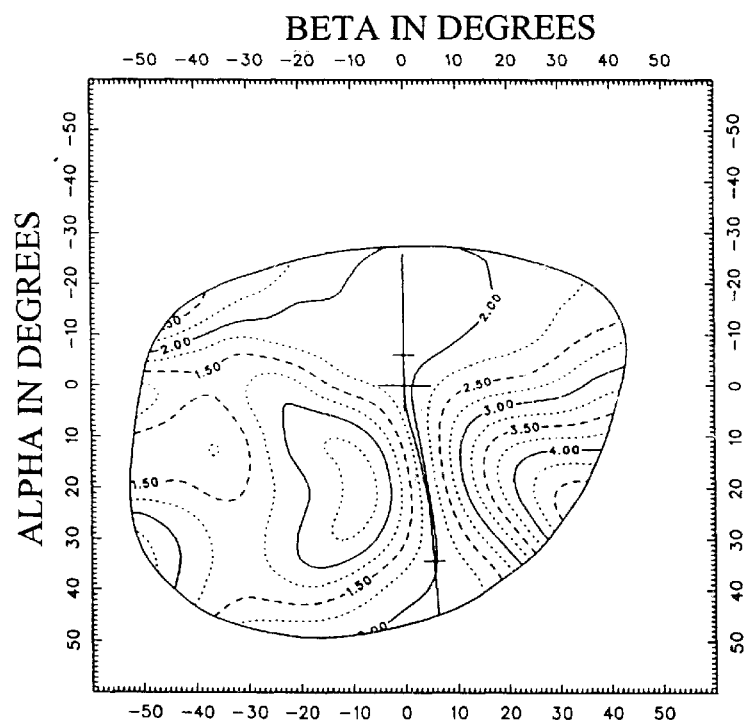
FIG. 26
FIG. 27
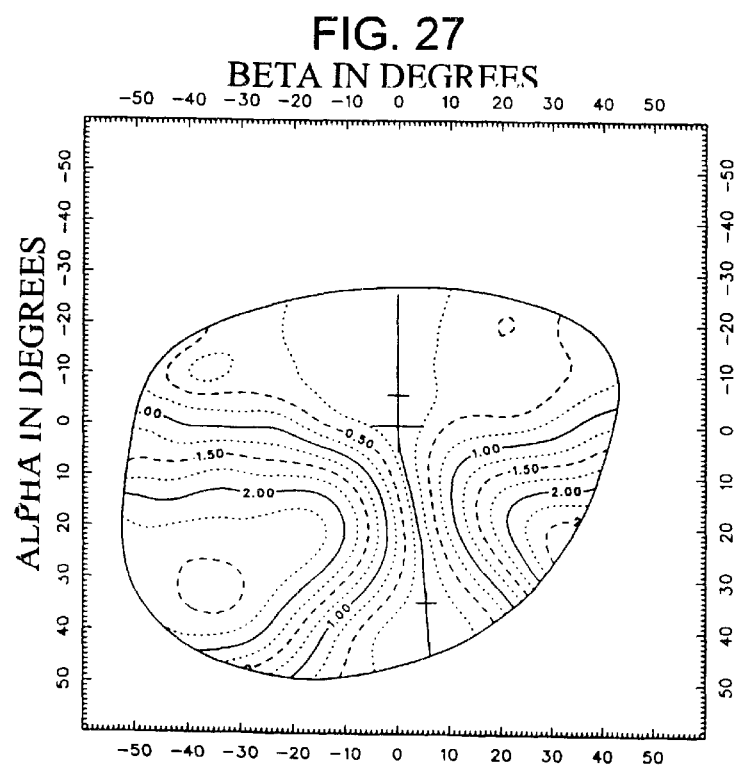

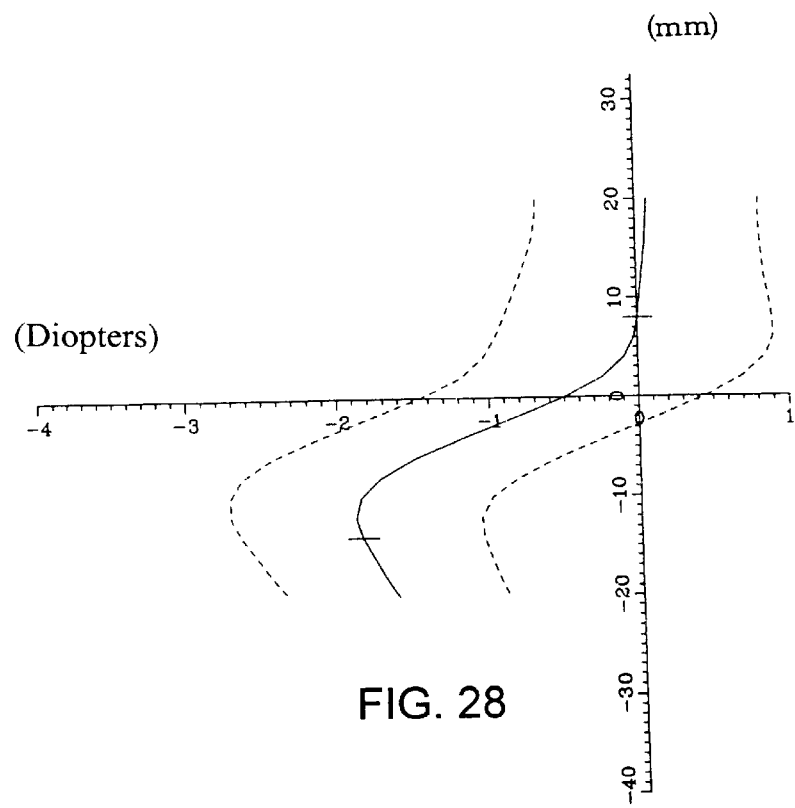
FIG. 28
FIG. 29
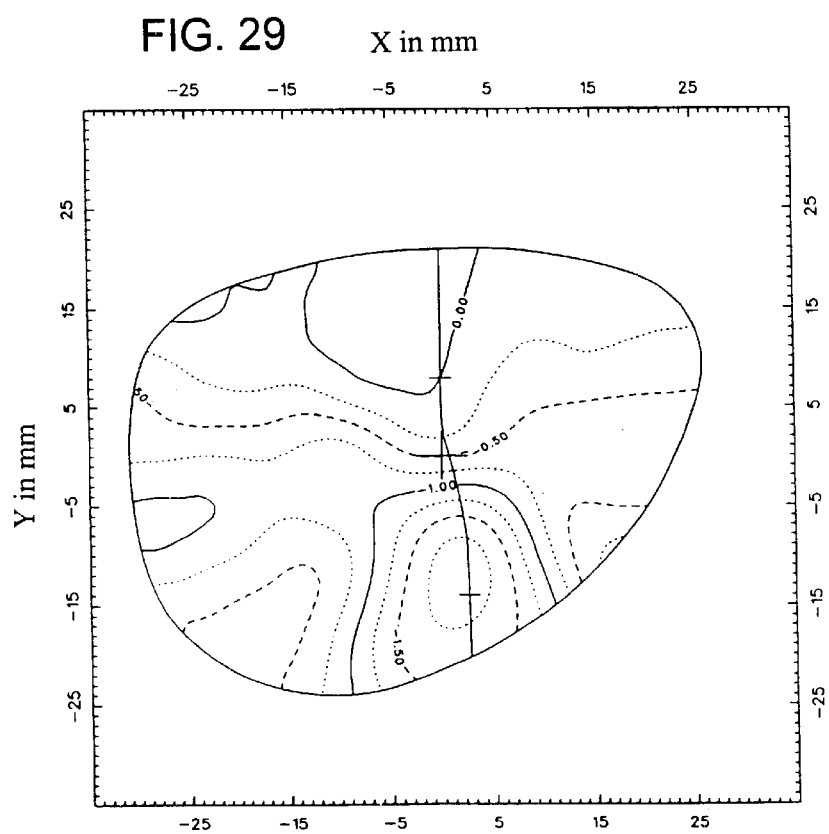

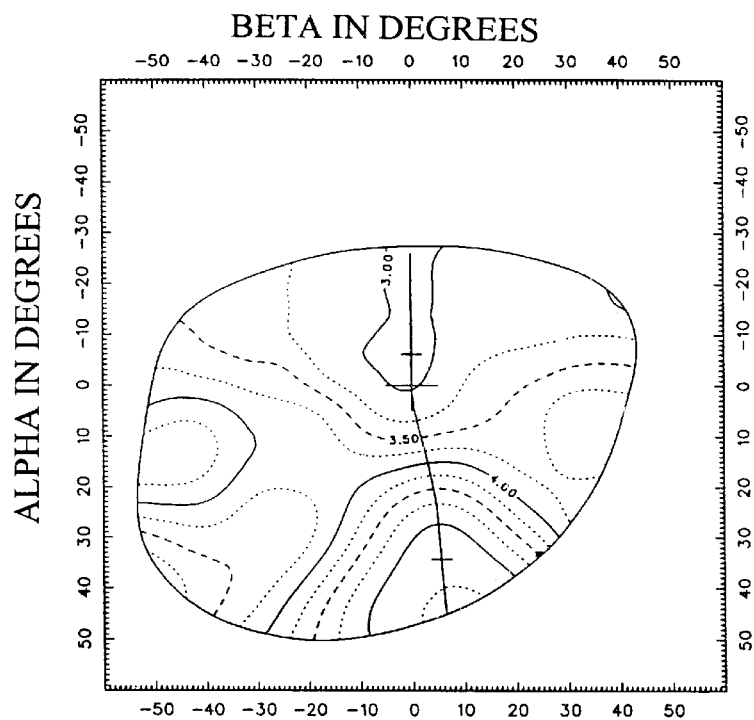
FIG. 32
PRIOR ART
PRIOR ART
FIG. 33
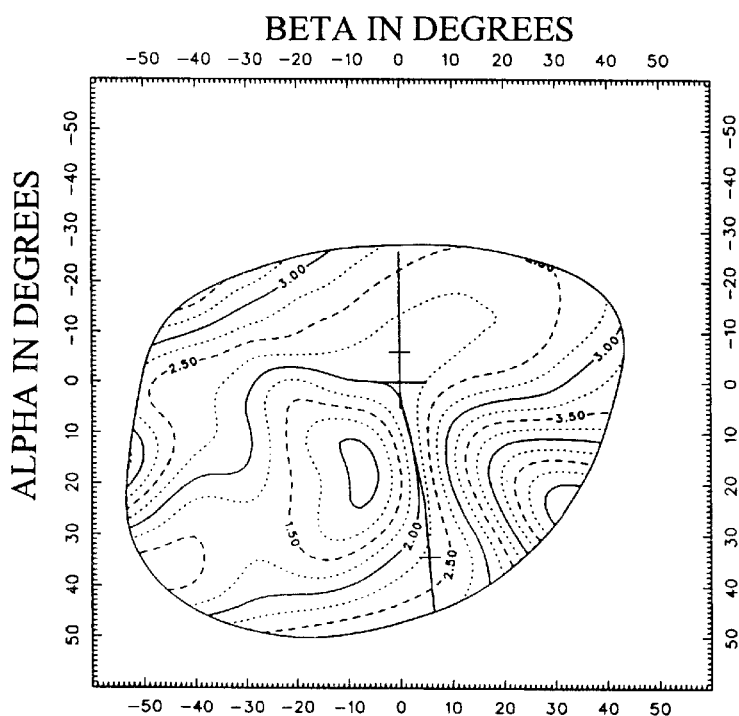

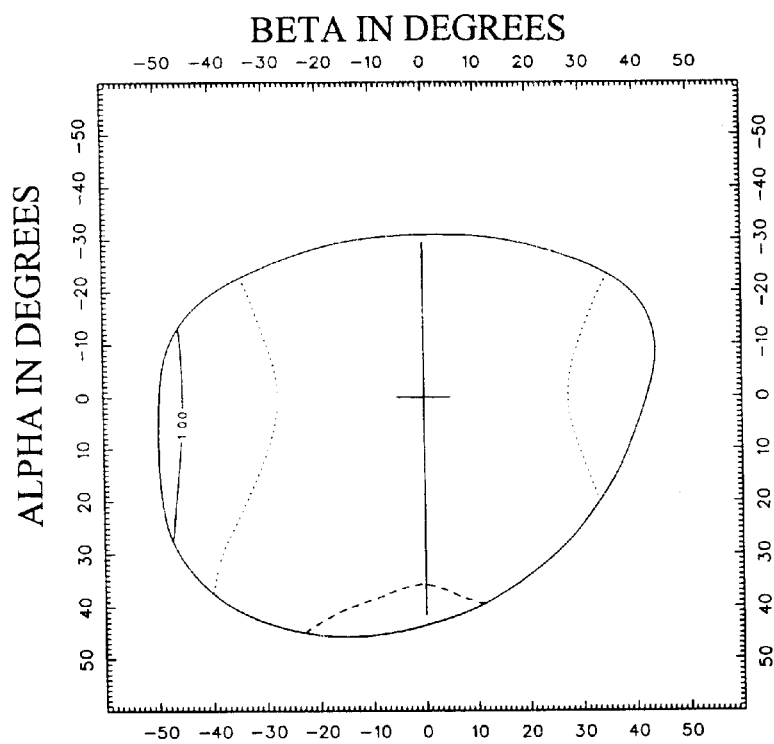
FIG. 36
FIG. 37
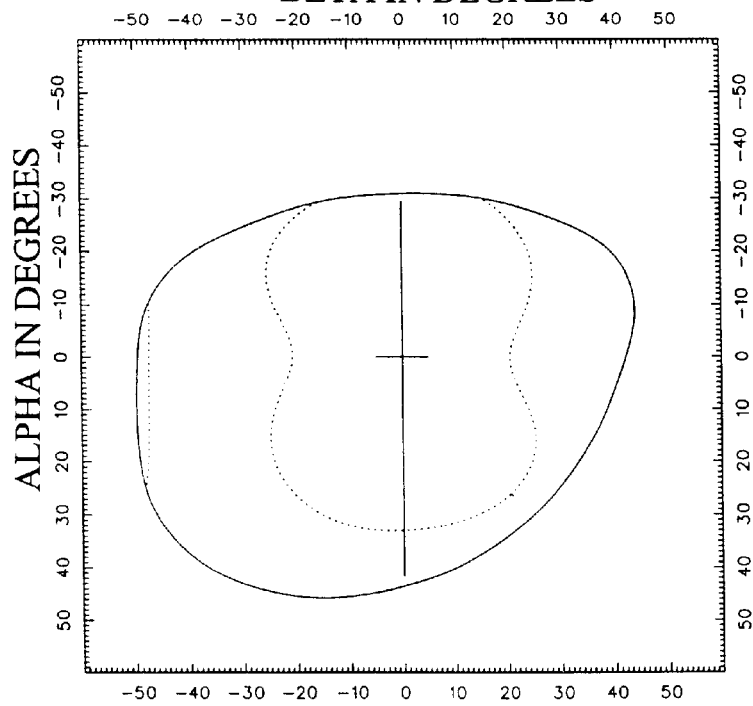

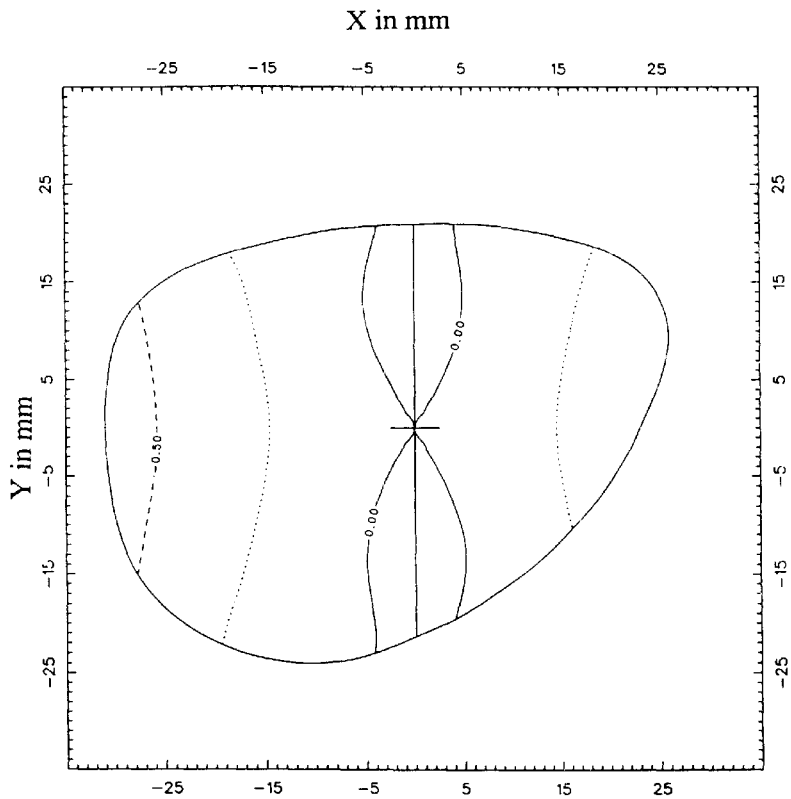
FIG. 40
FIG. 41
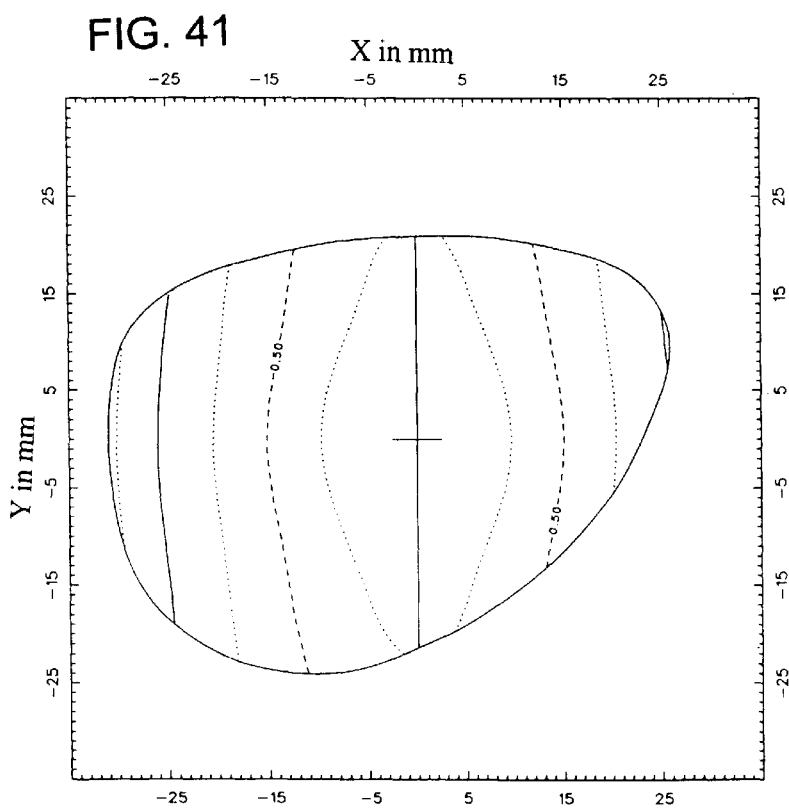

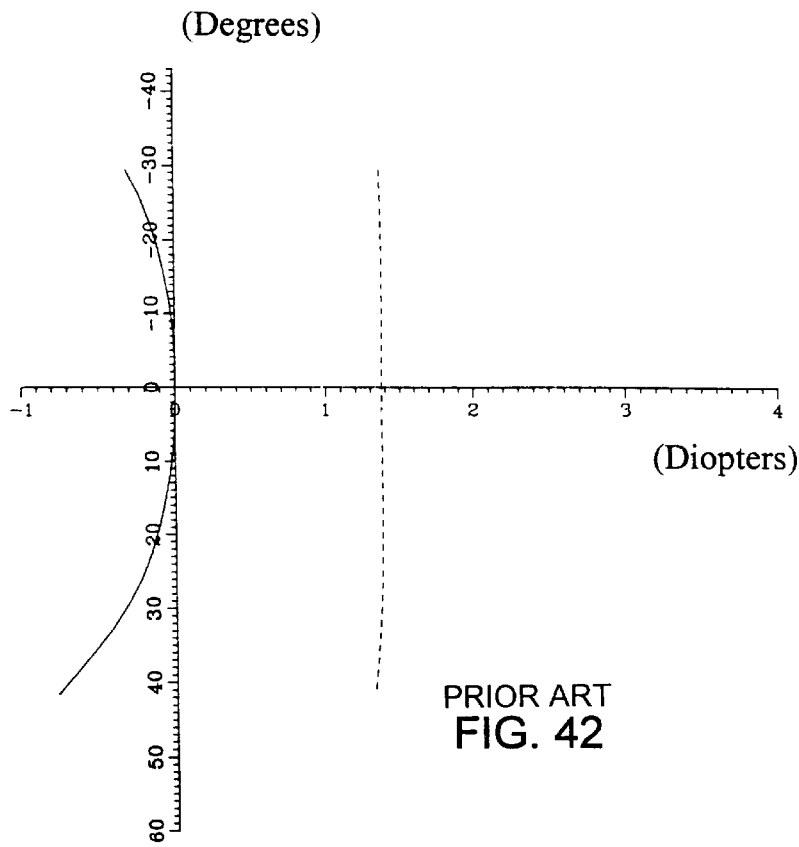
PRIOR ART
FIG. 42
PRIOR ART
FIG. 43
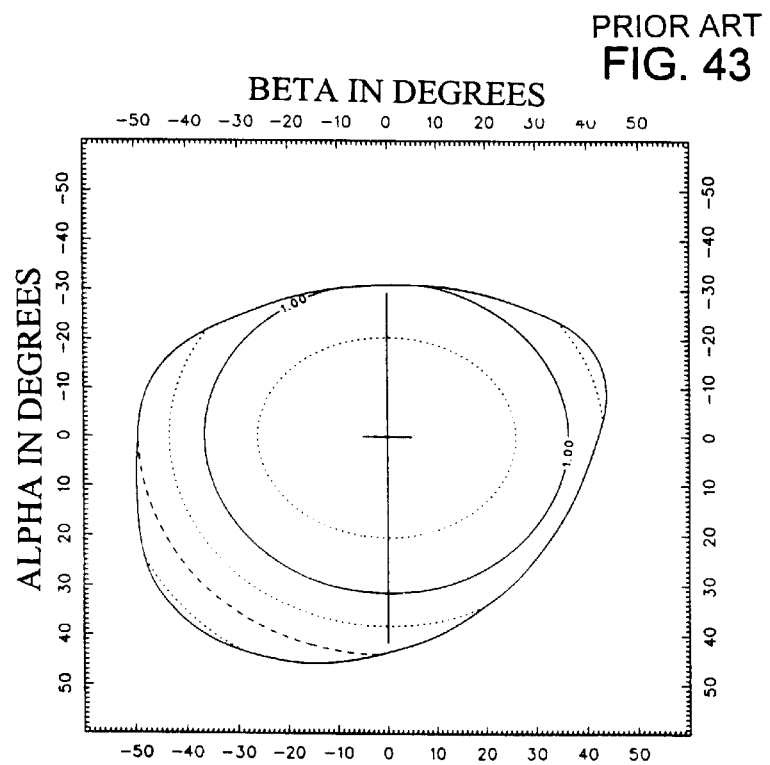

TORIC OPHTHALMIC LENSES

BACKGROUND OF THE INVENTION

The present invention relates to a method for determining an individual ophthalmic lens adapted to a wearer for whom an astigmatism has been prescribed; such lenses are also called toric ophthalmic lenses; they differ from ophthalmic lenses described as being spherical, the latter being intended to be worn by persons with no prescription for astigmatism. The method can be applied both to single-focus or multifocal lenses.

Multi-focal ophthalmic lenses are well-known; among these multi-focal lenses one can distinguish lenses known as progressive lenses, and lenses that are more specifically dedicated to near vision.

Multi-focal lenses present a particular problem for wearers needing correction of astigmatism. The astigmatism supplied to the wearer is the resultant of three components:

local cylinder of the progressive surface, characterised by its amplitude (or modulus) and its axis;

the prescribed cylinder and its axis;

oblique astigmatism.

Currently, to correct a spectacle wearer suffering from astigmatism, a lens is provided the front face of which is optimized in the case of a spherical prescription, and the rear face of which is a simple torus. Thus, account is not taken of the deterioration introduced by the torus; at best, one can play on the oblique astigmatism by adjusting the base value of the front face. For economic reasons, one cannot multiply the number of basic values existing already.

Multifocal progressive ophthalmic lenses are now well known. They are used for correcting longsightedness and allow the spectacle wearer to view objects over a wide range of distances without needing to take his glasses off. Such lenses typically comprise a far vision region, situated at the top of the lens, a near vision region at the bottom of the lens, the far and near vision regions being joined by an intermediate region, with a main meridian of progression passing through the three regions.

French Patent 2,699,294 describes the different elements of such a progressive multifocal ophthalmic lens in its introductory part, and mentions the works carried out by the applicant to improve the comfort of wearers of such lenses. Reference should be made to that document for more details on these various points.

Applicant has also proposed, for example in U.S. Pat. Nos. 5,270,745 or 5,272,495 to introduce a variation into the meridian, and notably to place it off-center with respect to a near vision control point, as a function of power addition and ametropy.

Applicant has also proposed, in order to better satisfy the visual requirements of presbytic (longsighted) persons and to improve comfort of progressive multifocal lenses, various improvements (French Patents 2,683,642, 2,699,294 and 2,704,327).

Lenses also exist that are more specifically dedicated to near vision; these lenses do not have a far vision region with a defined reference point like one finds in conventional progressive lenses. Such lenses are prescribed as a function of the power the wearer needs for near vision, independently of far vision power. Such a lens is described in an article in the "*Opticien Lunetier*" of April 1988, and is sold by the applicant under the Essilor Delta trademark; this lens is simple to use and just as easy to adapt to as a progressive lens, and is attractive to the population of presbytic persons not fitted with progressive lenses. This lens is also disclosed in French Patent application 2,588,973. It has a central portion which is equivalent to a single-focus lens which one would normally employ for correcting longsightedness, in order to ensure satisfactory near vision. It additionally has a slight decrease in power in the upper portion thereby ensuring the wearer has sharp vision also beyond the usual field of near vision. Finally, the lens has a point, at a value of power equal to the nominal power for near vision, a region of greater power in the lower portion of the lens, and a region of lower power in the upper portion of the lens.

Usually, multifocal lenses, whether they be progressive or dedicated to near vision, have one non-spherical multifocal face, for example the side facing the spectacle wearer, and one spherical or toric face, known as the prescription face. This spherical or toric face allows the lens to be adapted to the users's ametropy, so that a multifocal lens is generally only defined by its non-spherical surface. As is well known, such a non-spherical surface is generally defined by the altitude of all its points. One also uses parameters constituted by the maximum and minimal curvatures at each point, or more frequently, their half-sum and difference. This half-sum and difference multiplied by a factor n−1, n being the refractive index of the material of the lens, are known as mean sphere and cylinder.

For progressive multifocal lenses, one thus defines, by choosing a (power addition, base) pair, a set of non-spherical multifocal faces. Usually, one can thus define 5 basic values and 12 power addition values, giving a total of 60 multifocal faces. In each basic value, an optimization is performed for a given power, i.e. for a spherical prescription face having a given curvature.

The use within one of these multifocal faces of a spherical or toric prescription face having a power close to the prescription face considered for optimization makes it possible to meet all the requirements of wearers of progressive multifocal lenses. This known method makes it possible, starting from semi-finished lenses, of which only the multifocal face has been shaped, to prepare lenses that are adapted to each wearer, by simply machining one spherical or toric prescription face.

A similar method is used for optimization and prescription of lenses dedicated to near vision.

This method has the disadvantage of only being an approximation; consequently, the results obtained with a prescription face that is different from that used for optimization are worse than those corresponding to the prescription face employed for optimization.

U.S. Pat. No. 5,444,503 discloses a lens having a multifocal surface and a prescription surface. Compared to the prior art, which suggests defining the prescription service in order to obtain a given power at the far vision reference point, it is proposed, in that Patent, to define the prescription surface of the lens as a function of the power required by the wearer in a plurality of elementary surfaces. For this, the said United States.

Patent involves calculating aberration over the whole surface, and causing a continuous parametered surface to vary, for example a surface defined by splines, using known mathematical optimization algorithms. In practice, beyond the statement of principle, that Patent proposes using, in order to optimize the prescription surface, the distance to the cornea in an elementary surface, the object distance in an elementary surface, the inclination of the lens in the frame, the shape of the frame, and the curvature of the lens. That Patent says nothing regarding the effective calculation of the prescription surface. According to that document, their solution would make it possible to overcome the defects originating from replacement of the rear face used for optimization, by a rear face close to it.

That solution has the disadvantage of complicating lens manufacture: it involves determining, and machining, a non-spherical rear face. In this case, one should optimise and machine two complex surfaces. The proposed method does not appear to be founded on physiological data.

International application WO-A-96/13748 further discloses the use, for multifocal lenses, of a non-toric prescription surface, in order to limit defects with respect to the prescription surface employed for optimization. That Patent discloses prescription surfaces the main cross sections of which are circles having a radius defined by a given equation, the parameters of the equation depending on the wearer's sphere and cylinder. The solution disclosed in that document suffers from the same disadvantages as those described with reference to U.S. Pat. No. 5,444,503.

International application WO-A-97/19382 discloses a progressive ophthalmic lens having a front face that is spherical or exhibits symmetry of revolution, and a rear face obtained by combining a progressive surface having a power addition and a toric surface in which the torus is adapted to the wearer's astigmatism. The formula for combining these two surfaces is stated in the Patent, and gives the altitude of a point as a function of its coordinates in an orthonormalized reference frame, of mean sphere of the progressive surface at this point, and of curves for the progressive surface in the directions of the orthonormalized reference frame.

The algebraic combination of the two surfaces in that patent, using the given formula for combination, does not give satisfactory optical results. This method obliges the manufacturer to re-incline the front surface of the lens to obtain a satisfactory optical quality, thereby deteriorating lens aesthetics.

The prior art Patents say little or are not explicit regarding calculation techniques. Their techniques do not appear to be founded on physiological data, and do not use ray tracing.

SUMMARY OF THE INVENTION

The invention provides a method for determining a toric lens, based on a physiological law, making it possible to take account of the torsion of the eye for any given direction of glance. For each direction of glance, it is arranged for power and astigmatism, both as regards their value and direction, to be as close as possible to the prescription in the reference frame associated with the eye. Calculation of astigmatism in this reference frame makes it possible to take account of the effect of torsion of the eye, when the spectacle wearer is looking in an off-center direction. The method employs ray tracing and consequently an optical method.

The invention discloses a method making it possible to define a lens adapted for a toric prescription, the target being the behavior of a spherical lens; in this context, we shall call a spherical lens a lens that is adapted to be prescribed for a non-astigmatic wearer; i.e. not having overall cylinder.

The invention thus makes it possible to obtain lenses that are suitable for astigmatic spectacle wearers, which have better optical characteristics than those of the prior art.

The general method disclosed, which can be applied to any type of lens, makes it possible to overcome the disadvantages due to torus in a conventional toric prescription, and to give the spectacle wearer a perception which is equivalent to that of a spherical prescription.

The invention also provides for calculation of a lens that is unique for each prescription. Using other parameters, such as the shape of the frame, the distance between the cornea and the lens, the pantoscopic angle, it is possible to calculate a lens for each wearer.

More precisely, the invention discloses a method for the determination, using optimization, of an ophthtalmic lens for a wearer for whom an astigmatism has been prescribed, comprising the steps of:

selecting a starting lens and defining a working lens to be equal to the starting lens; selecting a target lens;

modifying the working lens, in order to minimize, in a plurality of directions of glance and in a reference frame associated with the eye:

a difference between power of said working lens and power of the said target lens;

a difference between residual astigmatism and astigmatism of the target lens;

residual astigmatism being defined as the difference between an astigmatism prescribed and astigmatism generated by the working lens both as regards amplitude and the axis thereof in the reference frame associated with the eye, and for each direction of glance.

Advantageously, power, astigmatism and residual astigmatism are calculated by ray tracing.

In a preferred embodiment, prescribed astigmatism is represented by expansion $(A_3, A_4, A_5)$ thereof into Zernike polynomials, and in which, in each direction of glance, the wave surface generated by the working lens is represented by the expansion $(a'_3, a'_4, a'_5)$ thereof into Zernike polynomials, and wherein amplitude of residual astigmatism in said direction of glance is equal to $$4\sqrt{(a'_3 - A_3)^2 + (a'_5 - A_5)^2}.$$

In another embodiment, in each direction of glance, a wave surface generated by said working lens is represented by expansion $(a'_3, a'_4, a'_5)$ thereof into Zernike polynomials, and power in said direction of glance is equal to $4a'_4$.

Preferably, the ophthalmic lens is a progressive lens.

In one embodiment, the ophthalmic lens is a lens dedicated to near vision.

Advantageously, orientation of the reference frame associated with the eye in a direction of glance $(\alpha, \beta)$ is deduced from orientation of the reference frame in the direction $(a'_3, a'_4, a'_5)\alpha=\beta=0$ by means of Listing's law.

Preferably, the said target lens is a spherical lens.

In one embodiment, the step of modifying the working lens is iterated in order to cause said differences to decrease.

In another embodiment, the step of modifying the working lens comprises modifying one single surface thereof.

A lens obtained by the above method, the surface of which is toric or spherical, is also provided.

Other advantages and characteristics of the invention will become more clear from the description which follows of several embodiments, provided by way of example and with reference to the attached drawings.

BRIEF DESCRIPTION OF THE DRAWINGS

FIGS. 11–14 show the optical characteristics of the lens the front face of which is optimized according to the invention, and for a rear face that is substantially different from that of the prior art lens.

FIGS. 15–17 show the surface characteristics of the front face of a lens optimized according to the invention.

FIGS. 18–20 show surface characteristics of the rear face of a starting lens, in a second embodiment of the invention.

FIGS. 21–23 show the optical characteristics of a reference lens.

FIGS. 24–27 show the optical characteristics of a lens the rear face of which is optimized according to the invention.

FIGS. 28–30 show the surface characteristics of the rear face of the lens optimized according to the invention.

FIGS. 31 to 34 show the optical characteristics of a lens similar to the prior art.

FIGS. 35–38 show the optical characteristics of a single-focus lens the front face of which is optimized according to a third embodiment of the invention.

FIGS. 39–41 show the surface characteristics of the front face of the optimized single-focus lens.

FIGS. 42–45 show the optical characteristics of a lens similar to the prior art.

DETAILED DESCRIPTION OF PREFERRED EMBODIMENTS

As is known per se, a mean sphere D can be defined for every point on a non-spherical surface, given by:

$$D = \frac{n-1}{2}\left(\frac{1}{R_1} + \frac{1}{R_2}\right)$$

where R1 and R2 are maximum and minimum radii of curvature expressed in meters, and n is the refractive index of the material from which the lens is made.

A cylinder is also defined, given by:

$$C = (n-1)\left|\frac{1}{R_1} - \frac{1}{R_2}\right|$$

For a given lens, for example a multifocal lens, the corresponding optical values are defined, specifically power and astigmatism; the power is defined as explained below. Astigmatism is calculated for example as described in B. Bourdoncle et al, "Ray tracing through progressive ophthalmic lenses", 1990, International Lens Design Conference, D. T. Moore ed., Proc. Soc. Photo. Opt. Instrum. Eng. One thus obtains possible definitions of the optical power and astigmatism of the lens, under the conditions in which it is worn. By the conditions under which a lens is worn, we mean the position of the lens with respect to the eye of an average spectacle wearer, notably defined by the pantoscopic angle, which is around 12°, by the distance between the lens and the eye, and the distance between the pupils.

One can not only use these definitions, but also determine power and astigmatism from coefficients resulting from decomposition of the wave surface. One further obtains definitions representative of wearing conditions.

Figure 1:
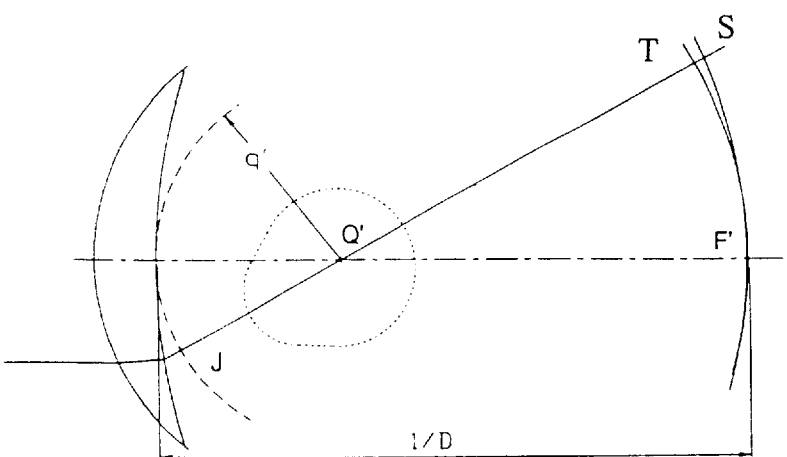
FIG. 1 shows an eye and lens optical system.

FIG. 1 is a diagram of an eye and lens optical system, showing the definitions employed in the remainder of this specification. Q' is the center of rotation of the eye, and a sphere of the vertices, centered on Q', is defined having a radius q', which is tangential to the rear face of the lens at a point in the horizontal axis. For example, a value for the radius q' of 27 mm corresponds to a common value and gives satisfactory results when the lenses are worn.

A given direction of glance corresponds to a point J on the sphere of vertices, and can also be defined, using spherical co-ordinates, by two angles $\alpha$ and $\beta$. Angle $\alpha$ is the angle formed between the straight line Q'J and the horizontal plane passing through the point Q', while angle $\beta$ is the angle formed between straight line Q' J and the vertical plane passing through the point Q'. A given direction of glance thus corresponds to a point J on the sphere of vertices or to a pair ($\alpha$, $\beta$). The image of the points in the object space, and in a direction of glance, and at a given object distance, is formed between two points S and T corresponding to a minimum and maximum focal length, which would be the sagittal and tangential focal lengths in the case of surfaces of revolution. On the optical axis, the image of a point in the object space at infinity is formed at point F'. The distance D is the focal length of the eye-lens system.

The term ergorama will be used to describe a function which maps each direction of glance to the distance of the object point habitually viewed; for more details of a possible definition of an ergorama, reference can be made to French Patent 2,753,805, which describes an ergorama, its definition and modelling process. A particular ergorama consists in only adopting points at infinity. For the method of this invention, points that are at infinity or not at infinity can be considered.

Figure 2:
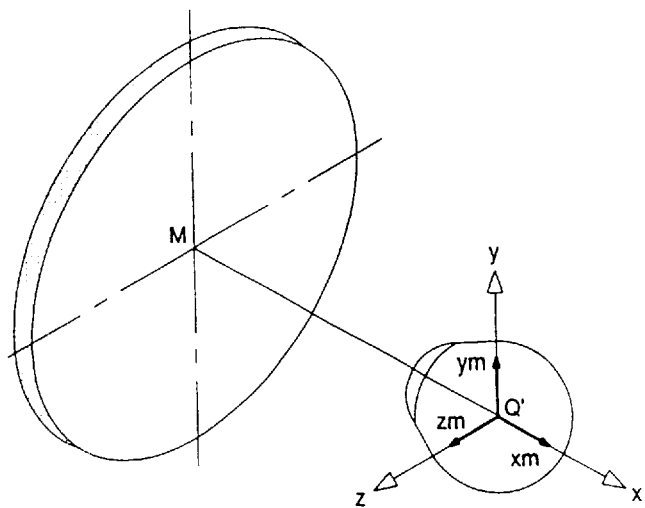
FIGS. 2 and 3 are diagrams defining a reference frame associated with the eye.
Figure 3:
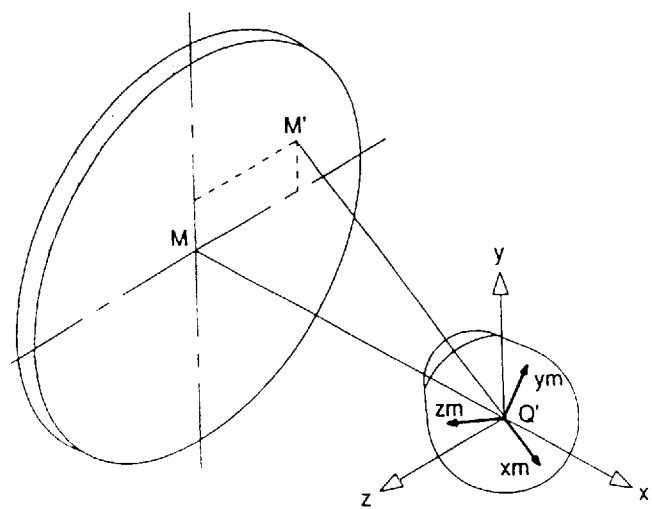

FIG. 2 shows the position of the eye and of the reference frame associated with the eye, in the main direction of glance, $\alpha=\beta=0$, known as the primary direction of glance. FIG. 3 shows the position of the eye and the reference frame associated therewith in a direction ($\alpha$, $\beta$).

Let $\{x, y, z\}$ be a fixed reference plane centered on Q'; axes x passes through the lens center, the y axis is the vertical, and the z axis is the horizontal. A reference frame associated with the eye is identified by $\{x_m, y_m, z_m\}$, centered on Q', the axis xm of which is given by the direction of glance, and which coincides with reference frame $\{x, y, z\}$ for the primary direction of glance. Listing's law gives the relations between the reference frames $\{x, y, z\}$ and $\{x_m, y_m, z_m\}$ see Legrand, "*Optique physiologique*" vol. 1, published by the Revue de l'optique, Paris 1969.

It is now possible to define, within the reference frame associated with the eye, and in a given direction of glance, the orientation and value of astigmatism as well as the power value, from a decomposition of the wave surface entering the pupil of the eye, which, for the sake of simplicity, we shall suppose has unit radius; these values correspond to the value and orientation of the astigmatism as well as the power which is effectively perceived by the wearer. The wave surface entering the pupil of the eye in each direction of glance can be obtained in a known manner by ray tracing.

In a manner known per se, a wave surface can be decomposed, on a unit radius pupil, using Zernike polynomials; in the ophthtalmic field, one generally limits oneself to the initial terms of this representation. A wave surface can be approximated by a linear combination of polynomials, of the type:

$$z(x_m, y_m, z_m) = \sum_i a_i p_i$$

in which $p_i$ are the Zernike polynomials, and $a_i$ are the real coefficients. For each direction of glance, the wave surface entering the pupil of the eye can be consequently expressed by the following relations, in which $p_i$ are the Zernike polynomials mapped to the reference frame associated with the eye:

$$p_3 = 2x_m y_m$$

$$p_4 = 2(x_m^2 + y_m^2) - 1$$

$$p_5 = x_m^2 - y_m^2$$

$$z(x_m, y_m, z_m) = \sum_i a_i p_i$$

The invention carries out this expansion into polynomials in a reference frame associated with the eye, for example, the reference frame {xm, ym, zm} mentioned above. In this case, the coefficients a3, a4 and a5 are representative of mean power and of astigmatism through the following relations:

the variable term in mean power is now given by $4a_4$, the modulus of astigmatism is given by $4\sqrt{a_3^2 + a_5^2}$, and the axis of astigmatism is obtained from the ratio a3/a5.

Other definitions of power or astigmatism in a reference frame associated with the eye could be employed, taking account of other coefficients of the decomposition, but the ones we employ have the advantage of being simple and of being able to be calculated readily using a ray tracing program, for a given lens.

The invention further employs this wave surface modelling in each direction of glance for the definition of an ophthalmic lens, taking account of the wearer's physiological data.

For this, we consider the prescription the wearer needs for far vision, as regards power and astigmatism, which can be transformed into coefficients ($A_3, A_4, A_5$). These coefficients are descriptive of the wave surface it is necessary to generate in order to perfectly correct the wearer's far vision. Expressing this in the Listing reference frame associated with the eye, the set of these three coefficients remains constant for all directions of glance.

Next, we consider a reference lens, which is a spherical lens, i.e. having no torus or astigmatism; we can take as a reference lens, a lens having a power addition and a mean power that are identical to those that were prescribed; one solution in the case of a progressive multifocal lens consists in considering the applicant's spherical lens of the type disclosed in French Patent applications 2,683,642, 2,683,643 and 2,699,294 and which are marketed under the Varilux trademark.

To this reference lens, there corresponds, in each direction of glance, a wave surface for a given object space and for given lens mounting conditions; one can thus derive from this a set of three coefficients ($A_3, A_4, A_5$) for each direction of glance. For the given object space, we can consider the ergorama of the type mentioned above, or any object space whatsoever. As regards mounting, we can consider conventional mounting conditions such as those described in the applicants above Patent application; we could also consider the mounting conditions for a given wearer.

One can, from these various sets of coefficients ($a_3, a_4, a_5$) and from the prescription ($A_3, A_4, A_5$) define, for each direction of glance, a target wave surface, suitable for use for optimizing a lens. In each direction of glance, the target wave surface is represented by a set of three coefficients ($a'_3, a'_4, a'_5$), with $$4a'_4 = 4a_4 \quad (1)$$

$$4\sqrt{(a'_3 - A_3)^2 + (a'_5 - A_5)^2} = 4\sqrt{a_3^2 + a_5^2} \quad (2)$$

The first relations (1) expresses the fact that it is desired to preserve the power behavior of the reference lens.

The second relation represents "residual" astigmatism, corresponding to the difference between the astigmatism created by the lens and the astigmatism prescribed for the wearer; this reflects the fact that the presence of the torus should not impair the performance of the reference lens. It will be noted that the invention is here described on the assumption that the prescribed astigmatism for far vision is in fact the astigmatism to be applied in each direction of glance, in the eye's reference frame. One could just as well adapt values of astigmatism and change the set of coefficients ($A_3, A_4, A_5$) as a function of the various directions of glance.

A constraint applying to residual astigmatism is that it must be equal to the reference lens's astigmatism; in the ideal case, residual astigmatism should be zero in each direction of glance. It has proved that this ideal constraint does not always make it possible to obtain a physical solution; the constraint imposed by the relation (2) is less rigorous than the ideal constraint, and does make it possible to obtain a solution. The choice of the proposed reference lens ensures that, in the foveal regions, astigmatism is substantially zero, and thus:

$$4\sqrt{(a'_3 - A_3)^2 + (a'_5 - A_5)^2} = 0$$

implying $a'_3 = A_3$ and $a'_5 = A_5$

Because of this, the axis of the astigmatism and its modulus are equal to the axis of the prescribed astigmatism and its modulus, at least in the foveal region.

These two relations do in fact define a target lens, which can be employed for lens optimization in an optimization program, as explained below. This target lens:

has the behavior and power of the reference lens;

has residual astigmatism equal to the astigmatism of the reference lens.

In the example given above, the reference lens has the same power and the same power addition as the lens prescribed. One could just as well choose as the reference lens a lens having a power or power addition different from that prescribed. In this case, relation (1) would be written as:

$$a'_4 = m + n a_4 \quad (1')$$

in which m and n are two real values chosen so that the far vision power and the power addition have the prescribed values. In other words, m and n are solutions to two equations having two unknowns, in the directions of glance for which the prescription is known, i.e. for far and near vision.

The invention proposes using these target values for defining lenses, using an optimization method which is known per se. It will be noted that the invention has been described above for the most complex case where the lens is a progressive multifocal lens; it applies just as well to optimization of spherical lenses, which correspond to a particular case where $$4\sqrt{A_3^2 + A_5^2} = 0$$

The invention also applies to the case of a single-focus lens, which corresponds to $4A_4 =$ constant.

Finally, the invention advantageously uses a ray tracing program for determining the optimized surface, under physiological conditions; it makes it possible to optimise a front face of the lens, for a given rear face, or vice-versa.

We shall now describe a method for optimization which can be employed for carrying out the invention. The aim of the optimization process, setting out from a starting lens, is to cause the parameters defining at least one of the surfaces of a working lens to vary in order to satisfy as closely as possible, constraints (1) and (2) defined above.

For this, we can consider a merit function representing the differences between the lens to be optimized and the target lens, defined as follows. For a set of points on the lens, or a set of glance directions, referenced by a variable i, we shall consider the merit function written in the form:

$$\sum_i p_i \sum_j w_{ij}(V_{ij} - C_{ij})^2$$

Where $p_i$ is a weighting for point i;

$V_{ij}$ is the value either of residual astigmatism, or of the power at point i, for the working lens;

$C_{ij}$ is the value either of target astigmatism, or of target power;

$w_{ij}$ is the weighting for the difference in astigmatism'or power at point i.

We thus define in this way a target, and a merit function which is representative of the difference in optical characteristics between a lens and the said target. Such a merit function is obviously positive and it should be minimised during the optimization process.

In order to proceed with optimization, it is now sufficient to select a starting lens and a method of calculation which makes it possible to decrease, through iteration, the value of the merit function. For this, one can advantageously employ a damped least squares method, or yet again any other optimization method known per se. By using a damped least squares method and a merit function of the type defined above, ten or so iterations are sufficient to yield, in the majority of cases, a lens having good performance.

In order to proceed with optimization, one can advantageously use, for the lens to be optimised, a decomposition of the wave surface at the pupil of the eye, using Zernike polynomials, in order to be able to directly employ constraints in the form of relations (1) and (2) given above. In this case, one can set out from the starting lens and add a layer to be optimized to the corresponding surface, and then only modify this layer in the optimization process, this layer itself being able to be modeled by means of Zernike polynomials.

We shall now give examples of optimization using such expansion into Zernike polynomials. The prescription, as indicated above, provides a set of three coefficients ($A_3$, $A_4$, $A_5$); the reference lens supplies, in directions of glance corresponding to the points i selected, the sets of three coefficients $(a_3, a_4, a_5)_i$.

The target is written now, in each direction of glance or for each point i as:

$$C_{i1} = 4a_4$$

$$C_{i2} = 4\sqrt{a_3^2 + a_5^2}$$

for the corresponding set of coefficients ($a_3$, $a_4$, $a_5$).

The working lens has, in the direction of glance corresponding to point i, a current power value of $$V_{i1} = 4a'_4$$

and for $V_{i2}$, residual astigmatism, as explained above, we use:

$$V_{i2} = 4\sqrt{(a'_3 - A_3)^2 + (a'_5 - A_5)^2}$$

The values of a'3, a'4 and a'5 are now varied at various points i, in order to decrease the merit function, as explained above.

At the end of optimization, an altitude map of the optimized surface, defining the surface to be provided, is obtained.

The examples that follow give several embodiments of the invention.

EXAMPLE 1

In this example, we optimise the front surface of a lens the rear surface of which is a toric surface of the type used in the prior art, but which does not necessarily correspond to the toric prescription for the spectacle wearer. We attempt to obtain a multifocal lens for the following prescription:

far vision power: 3 diopters;

astigmatism: 2 diopters;

axis of astigmatism: 135°;

addition: 2 diopters;

refractive index: 1.502.

Figure 4:
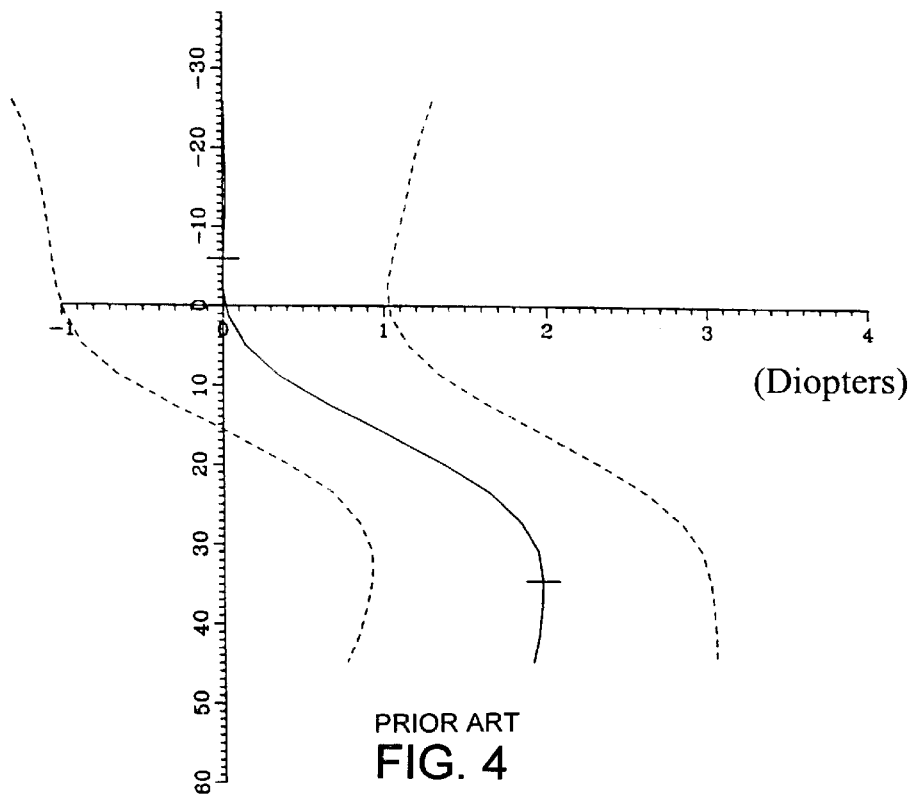
FIGS. 4–7 show the optical characteristics of a prior art lens.
Figure 5:
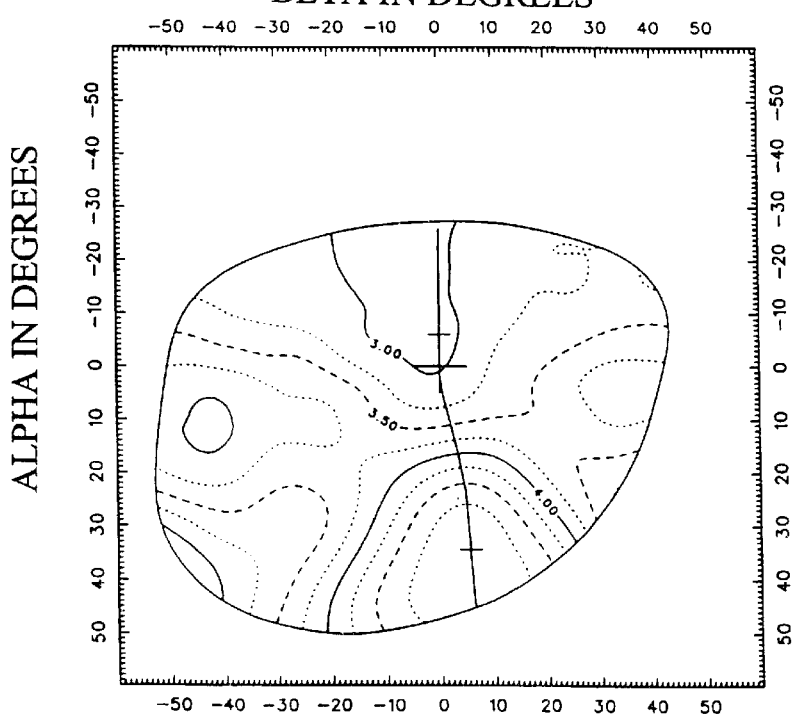
Figure 6:
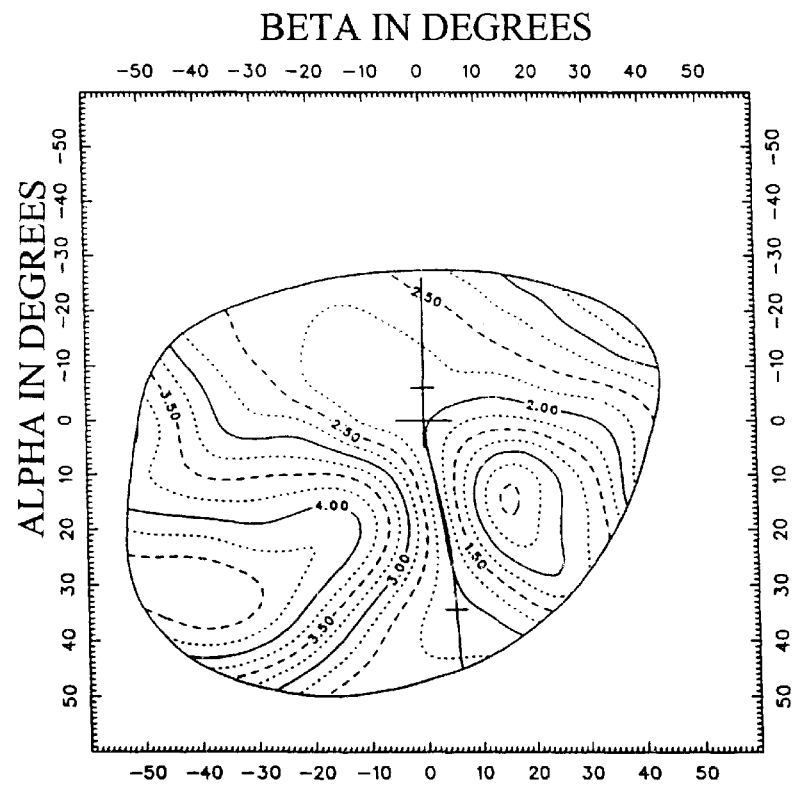
Figure 7:
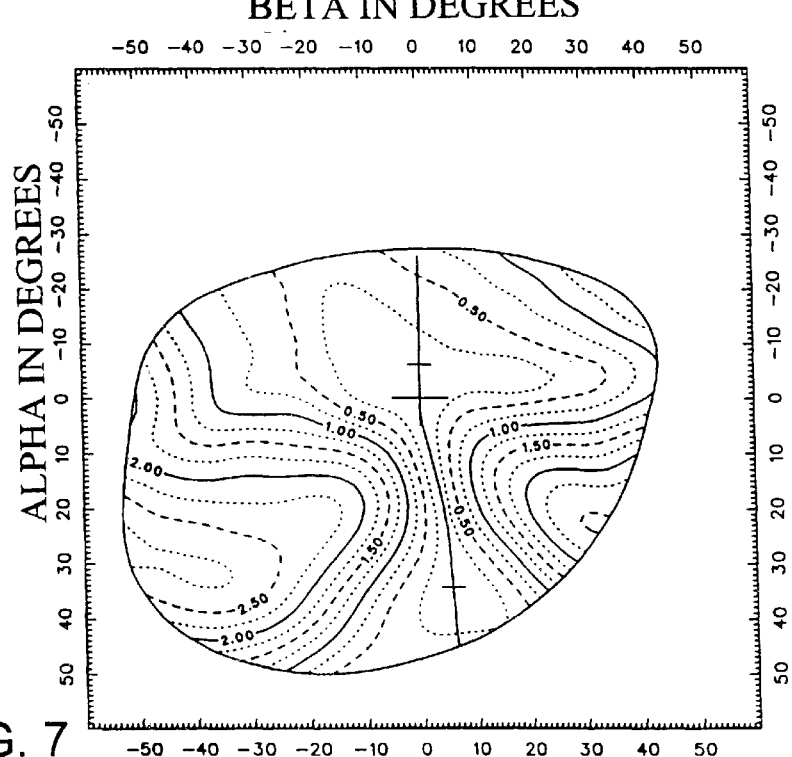

FIGS. 4 to 7 show the optical characteristics of a prior art lens; FIG. 4 shows power along the meridian, with the definition of power as given above. The x-axes are graduated in diopters, and the y-axes give the height, in degrees, on the lens; the solid line indicates power and the dashed lines the amounts 1/JT and 1/JS defined in FIG. 1, for object distances corresponding to an ergorama representative of the distances of object points in each direction of glance, in order to ensure optimum comfort for the wearer. FIG. 5 shows lines of equal power, i.e. lines formed by points for which power has an identical value. The x-axis and y-axis respectively give the angles β and α. FIG. 6 shows, using the same axes, lines of equal oblique astigmatism. FIG. 7 shows residual astigmatism, as defined above.

This lens is a prior art lens, in which the rear face carries the torus, while the front face is a multifocal progressive surface such as those disclosed in the applicant's Patents. This lens has a base of 6.20 diopters, a far vision power of 2.97 diopters, a power addition of 1.97 diopters and an astigmatism of 2.11 diopters, with an axis of 135°.

Figure 8:
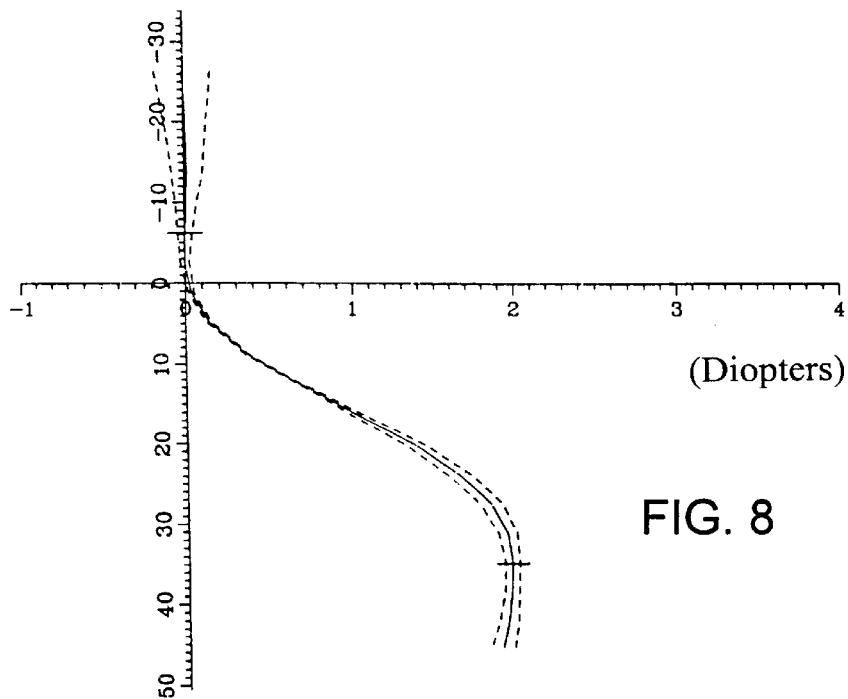
FIGS. 8–10 show the optical characteristics of a reference lens.
Figure 9:
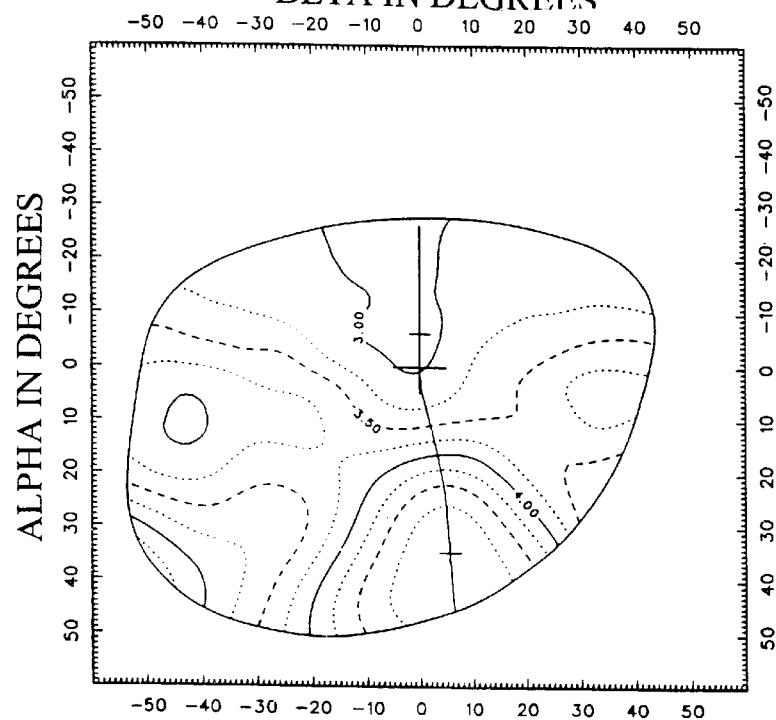
Figure 10:
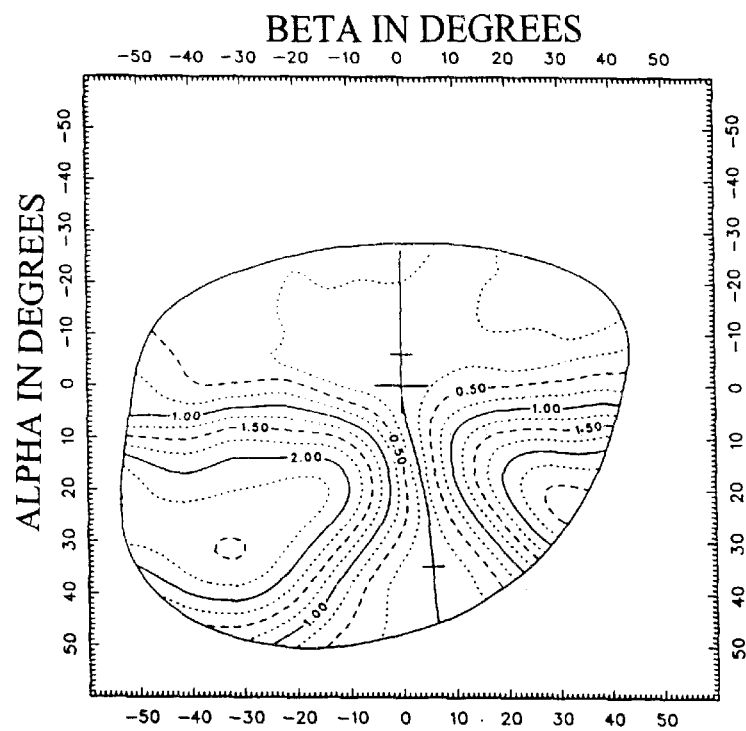
Figure 11:
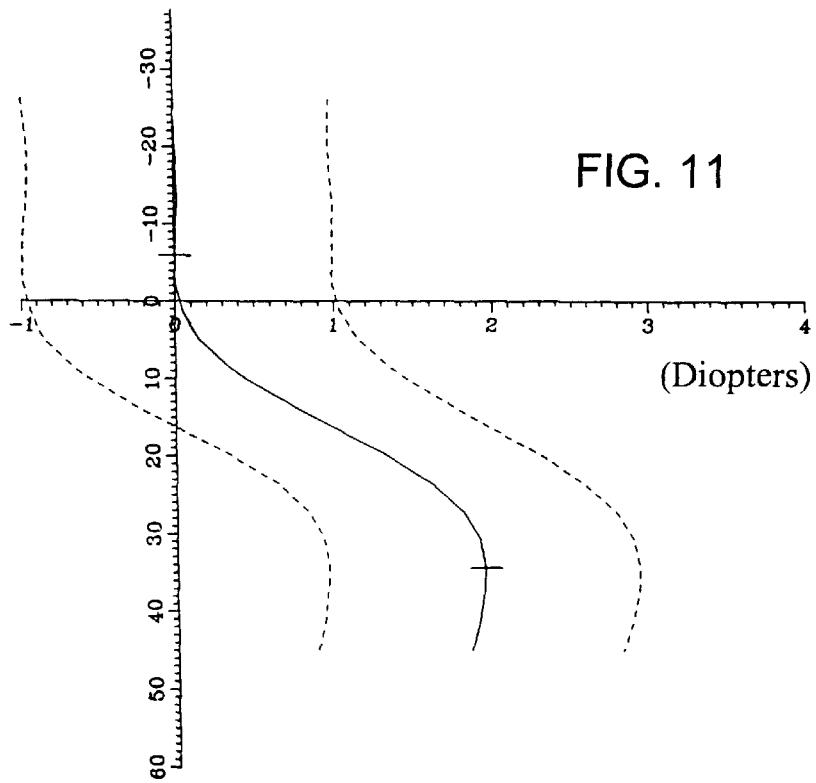
Figure 14:
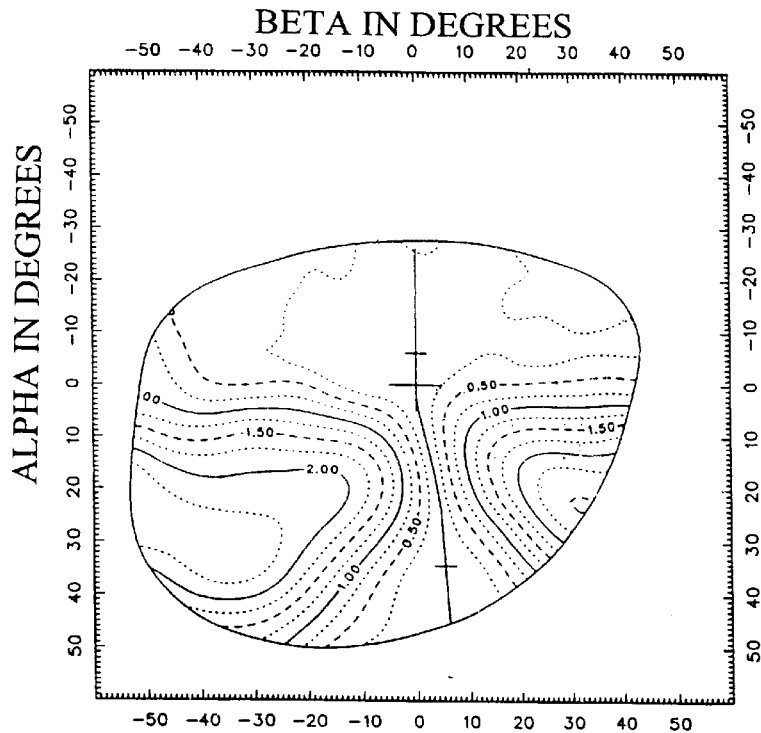

FIGS. 8 to 10 show optical characteristics of the reference lens employed for optimization; this lens is a spherical lens, having the same power equal to 2.97 diopters for far vision, the same power addition equal to 1.98 diopters, and no astigmatism. FIGS. 8 to 10 are produced similarly to FIGS. 4 to 6, using the same conventions.

FIGS. 4 to 11 show the optical characteristics of the lens optimized according to the invention; FIGS. 4 to 11 have also been produced similarly to FIGS. 4–7, using the same conventions. As indicated above, it is the front face that has been optimized, using a starting lens having the same front face as the prior art lens, but with an approximated toric rear face, and the lens in FIGS. 8 to 10 as a reference lens. The Figures show that the optical characteristics of the lens optimized according to the invention are very close to those of the reference lens. We have thus avoided the aberrations introduced by the toric rear face of the prior art lens. The lens has a base value of 6.63 diopters, a far vision power of 3.02 diopters, a power addition of 1.94 diopters and an astigmatism of 1.99 diopters on an axis of 135°.

Figure 15:
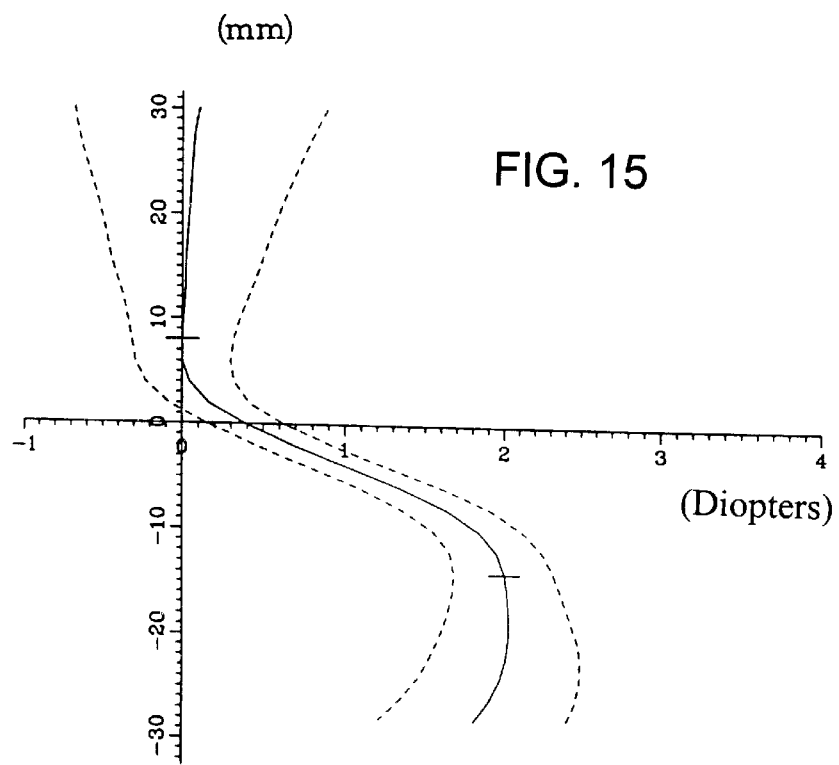

FIGS. 15 to 17 show surface characteristics of the front face of the lens in FIGS. 11–14. FIG. 15 shows surface power or mean sphere D, as defined above: the solid line shows mean sphere, and the dashed lines the values $C_1$=(n–

1)/$R_1$ and $C_2=(n-1)/R_2$ with R1 and R2 being the principal radii of curvature. The x-axis is graduated in diopters and the y-axis gives the height on the front face, in millimeters. Mean sphere at the far vision reference point is 6.63 diopters for a cylinder of 0.63 diopters; mean sphere at the near vision reference point is 8.63 diopters, for a cylinder of 0.64 diopters. It will be noted from this representation alone that the invention leads to cylinder or torus being distributed over both faces of the optimized lens.

FIG. 16 shows lines of mean isosphere for the front face of the lens; the axes are graduated in millimeters; FIG. 17 shows isocylinder lines, using the same axes. These Figures show that the front face of the lens of the invention is very different from the front faces of conventional lenses.

The invention, as implemented in this example, shows the aberrations introduced by prior art methods, and shows how the invention, by taking account of the spectacle wearer's physiological data, and thanks to optical calculations, makes it possible to reduce these aberrations. We thus correct the aberrations introduced by the torus in the prior art lens, and we provide the spectacle wearer with foveal vision that is equivalent to that of an emmetropic spectacle wearer with the same power addition. We also show that the toric part missing in the starting lens is transferred to the front face.

EXAMPLE 2

In this example, the invention is applied to the optimization of the rear face of a progressive multifocal lens, for which torus and degression are situated on the rear face of the lens.

The prescription is as follows:

far vision power: 3 diopters;

astigmatism: 2 diopters;

axis of astigmatism: 45°;

power addition: 2 diopters;

refractive index: 1.502 diopters.

The front face of the lens is spherical.

Figure 20:
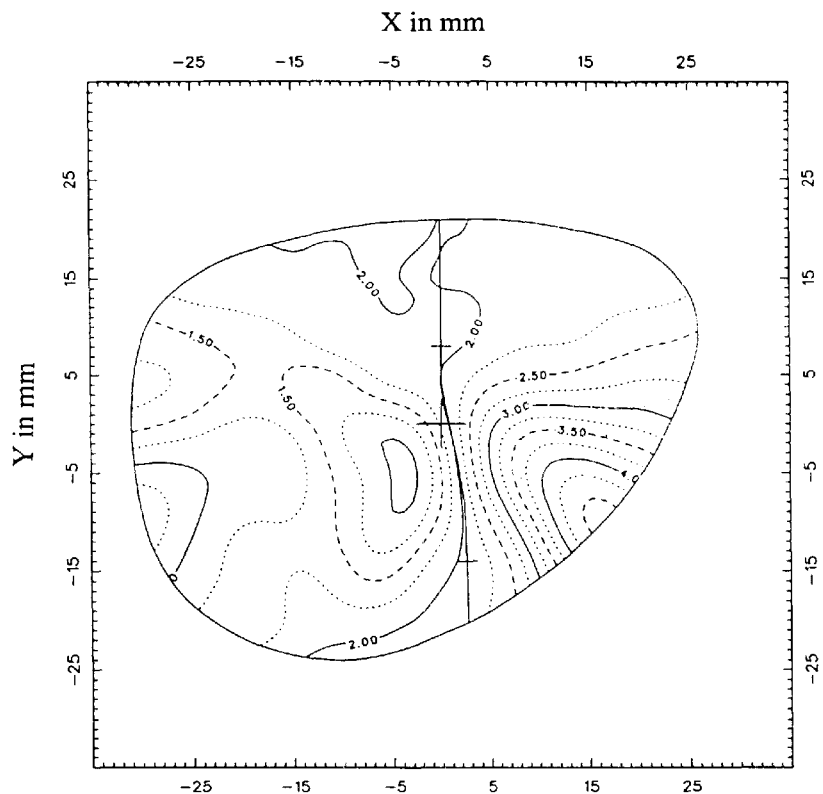

FIGS. 18–20 show, using the same conventions as those of FIGS. 15–17, surface characteristics of the rear face of the starting lens; the front face is spherical; the rear face is calculated in an approximate manner by summing the altitudes of a conventional multifocal progressive surface and a toric surface, taking account of the front face. More precisely, the following three surfaces are considered:

S 1: progressive surface of power addition 2.00 diopters, and base 6.20 diopters;

S 2: sphere of radius identical to the radius for far vision of the conventional progressive surface;

S 3: toric surface providing an astigmatism of 2.00 diopters and a power of 3.00 diopters for the front face considered.

The altitude of a point on the rear starting face is given by $$z=-z_1+z_2+z_3$$

where $z_1, z_2$ and $z_3$ are the respective altitudes of the three surfaces $S_1$, $S_2$ and $S_3$; the terms $-z_1+z_2$ approximately define a plane surface for far vision and a surface that is degressive for near vision; the term $z_3$ adds the expected toric effect. In this way, we obtained a rear face of a mean sphere for far vision equal to 3.34 diopters, of degression 2.18 diopters. At the far vision reference point, the rear face has a cylinder of 1.99 diopters, and at the near vision reference point, it has a cylinder of 2.07 diopters. The front face of the lens has a spherical surface of radius 6.20 diopters.

Figure 21:
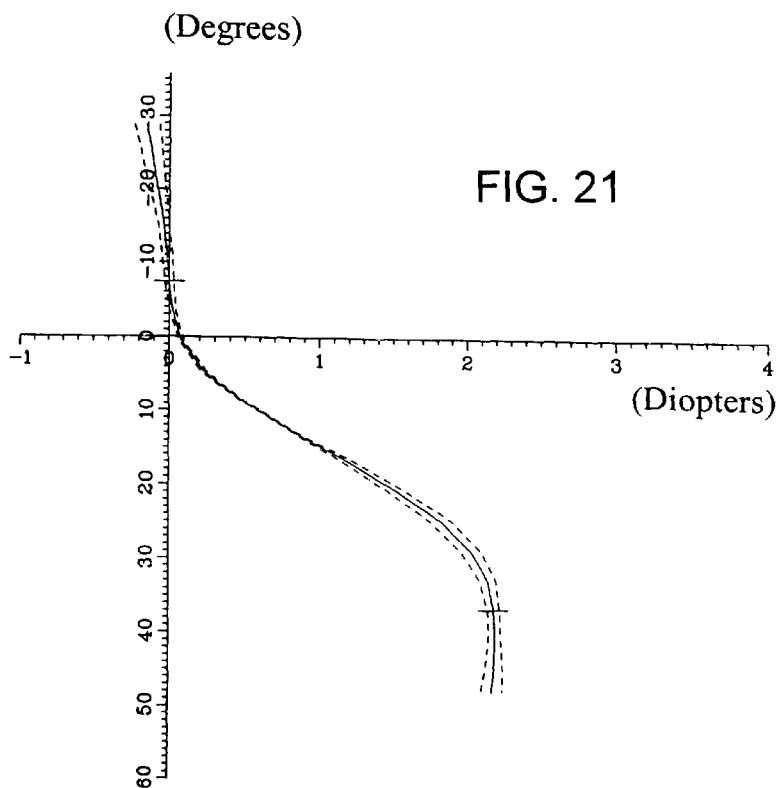

FIGS. 21–23 show, using the same conventions as FIGS. 8–10, optical characteristics of the reference lens. For the reference lens, we have used a lens having a conventional progressive front face and a spherical rear face; the lens has zero power for far vision, a power addition of 2.19 diopters, and a base of 6.20 diopters as indicated above.

FIGS. 24–27 show optical characteristics of the lens optimized according to the invention, using the same conventions as in FIGS. 11–14. The optimized lens has a power at the far vision reference point of 2.98 dioptes, an astigmatism at the same point of 1.94 diopters, a power at the near vision reference point of 5.12 diopters, and an astigmatism at the same point of 1.97 diopters. This lens is obtained by adding a power of 3 diopters to the reference lens employed.

Figure 30:
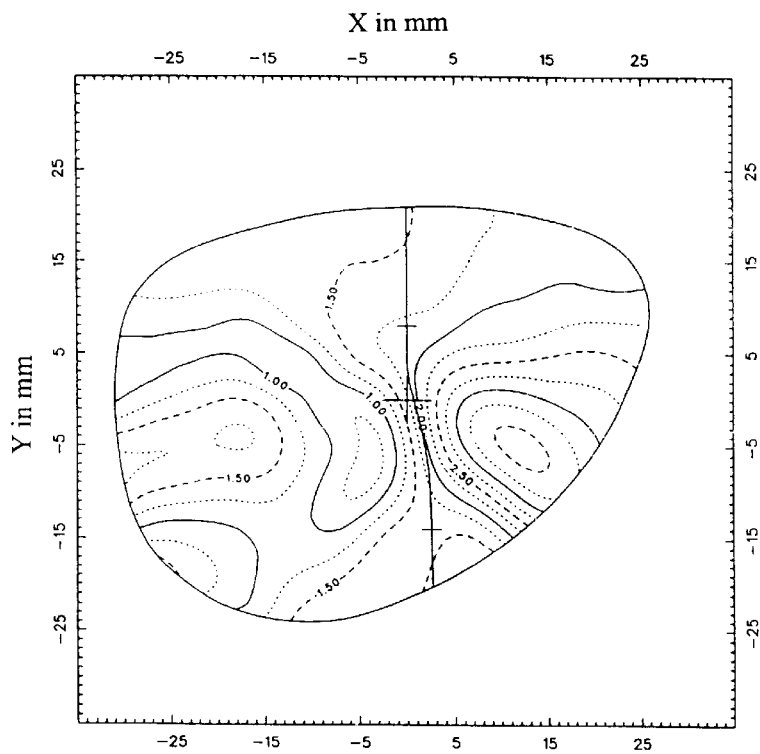
Figure 31:
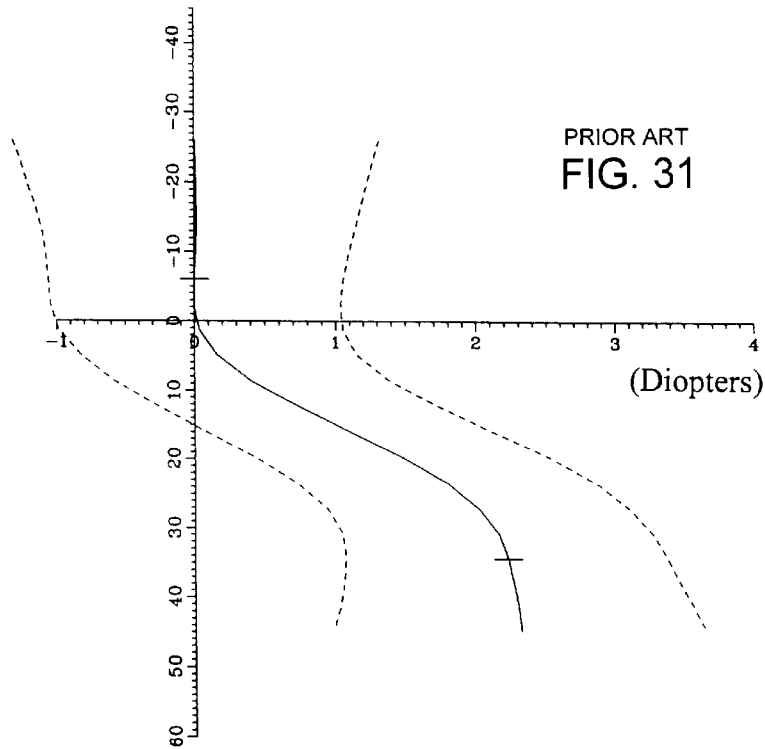
Figure 34:
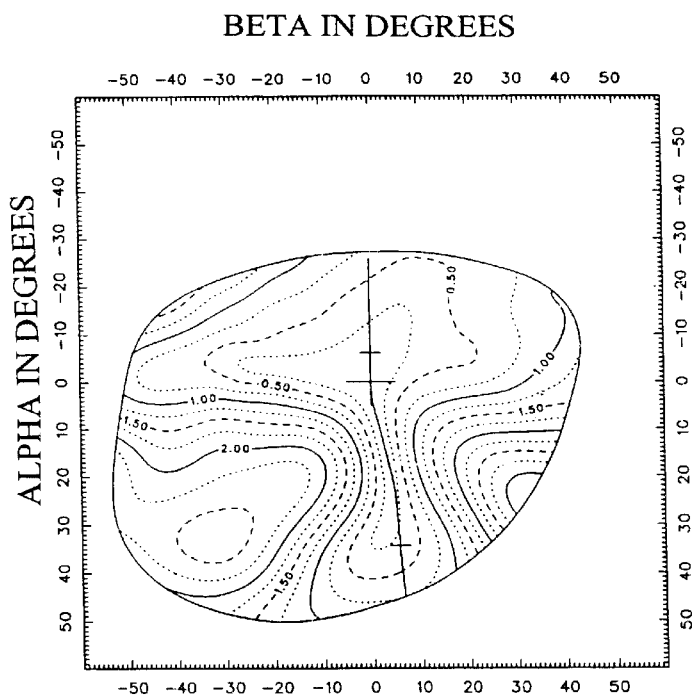
Figure 35:
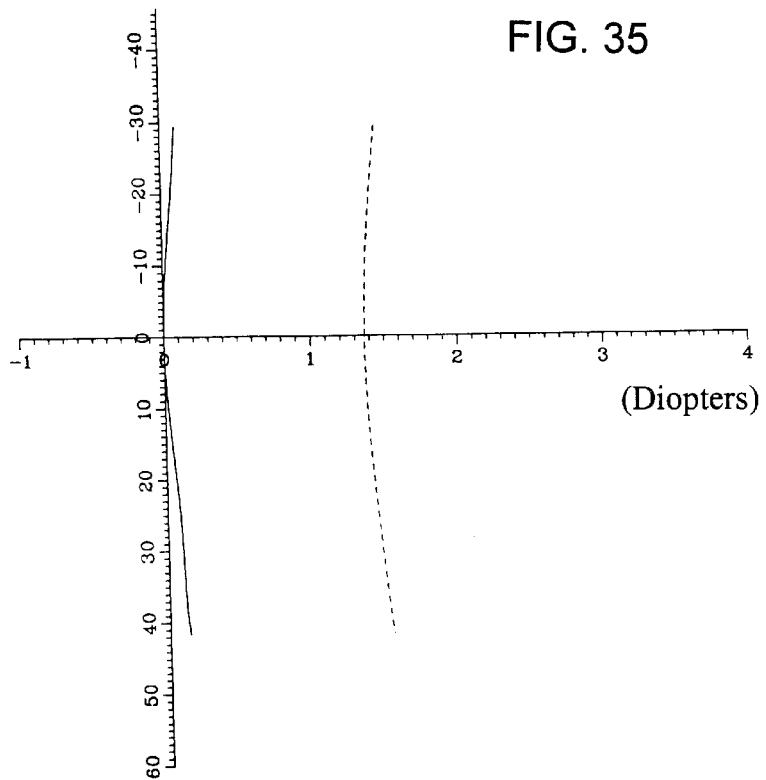
Figure 38:
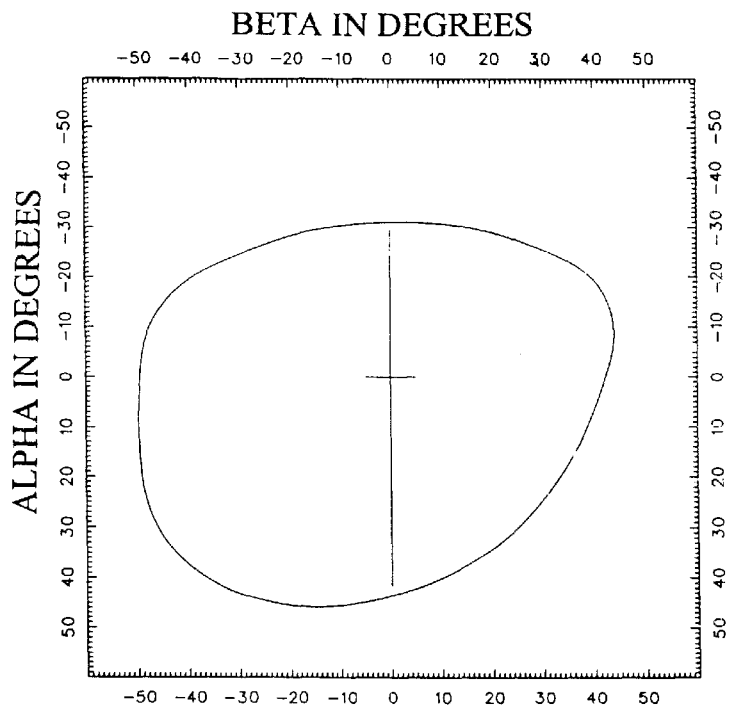

FIGS. 28–30 show surface characteristics of the rear face of the lens optimized ccording to the invention, using the same conventions as in FIGS. 15–17. The rear face has a mean sphere of 3.34 diopters at the far vision control point and a cylinder of 1.79 diopters. At the near vision reference point, the rear face has a mean sphere of 1.49 diopters, and a cylinder of 1.59 diopters. Degression of the rear face is 1.85 diopters.

FIGS. 31–34 show, for the purposes of comparison, the optical characteristics of a prior art lens. The conventions used are the same as those in FIGS. 24–27. Again it will be noted, as in the example of FIG. 11, that the lens optimized according to the invention has smaller aberrations than those of the prior art lens. Additionally, residual astigmatism, as experienced by the spectacle wearer, is close to the astigmatism of the reference lens.

EXAMPLE 3

In this example, the front surface of a single-focus lens was optimized, the rear face of which included a conventional torus.

The prescription is as follows:

sphere: 0 diopters;

cylinder: 2.75 axis of cylinder: 90°;

refractive index: 1.604.

The starting lens had a spherical front face with a base equal to 4.58 diopters. The rear face corresponded to the prescription according to the prior art.

In this very simple case, the targets for resultant astigmatism are assumed to be zero and the targets for power are all identical and equal to 1.375 diopters.

FIGS. 35 to 38 show, using the same conventions as in FIGS. of 4–7, the optical characteristics of the lens optimized according to the invention. At the control point, power is 1.39 diopters, and astigmatism is 2.74 diopters.

Figure 39:
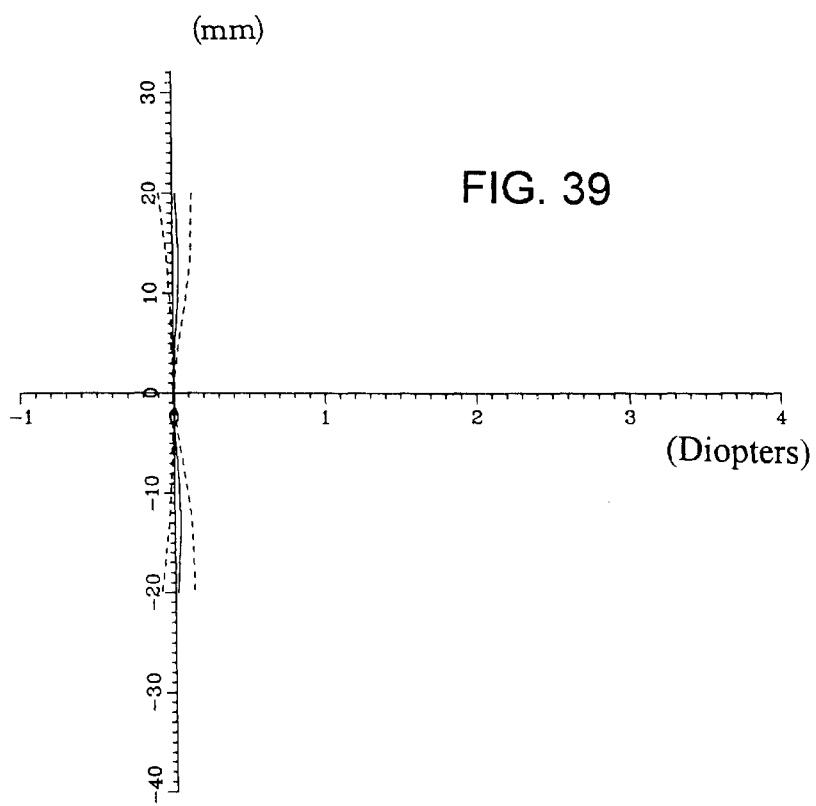
Figure 44:
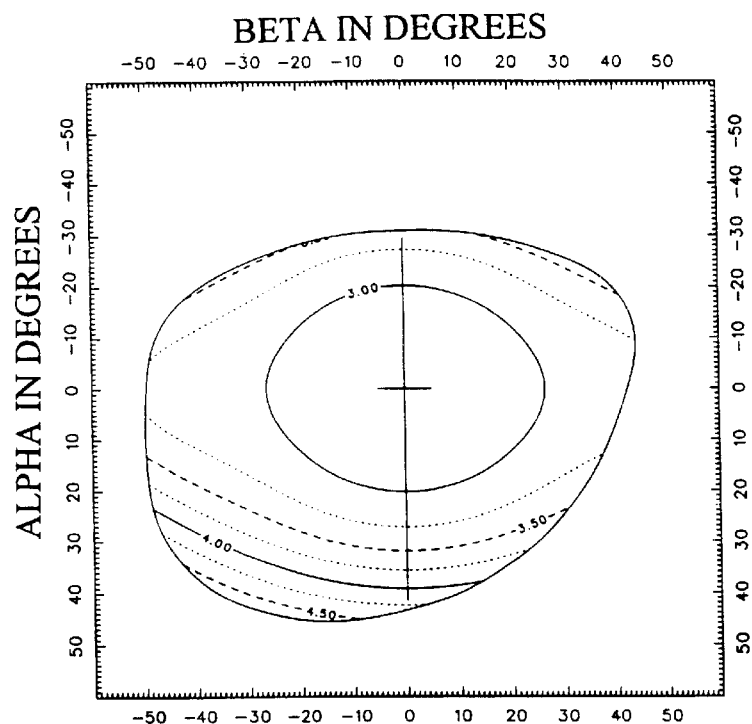
Figure 45:
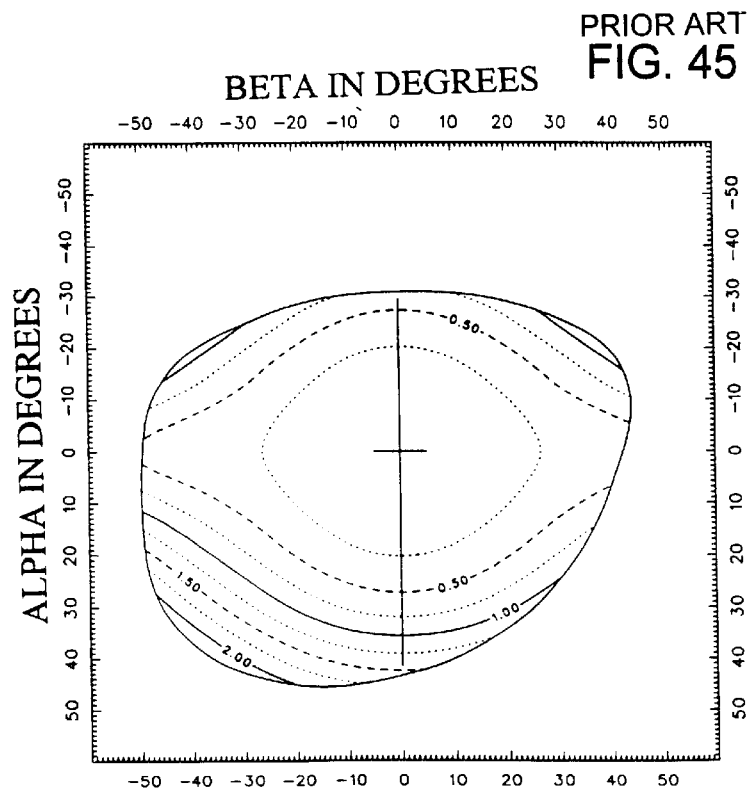

FIGS. 39–41 show, using the same conventions as in FIGS. 28 to 30, surface characteristics of the front face of the optimized single focus lens. Mean sphere at the control point is 4.58 diopters, and cylinder is 0.02 diopters.

By way of comparison, FIGS. 42–45 show the optical characteristics of a non-spherical lens of the prior art for the same prescription. The same conventions have been used as in FIGS. 35 to 38.

It will again be noticed that the invention makes it possible to reduce aberration and to obtain a lens for which residual astigmatism as experienced by the spectacle wearer, is substantially zero.

The invention makes it possible, for multifocal or single focus lenses, to obtain optical characteristics similar to those of the best lenses of the prior art, and this despite a prescription for astigmatism. The method of the invention provides results better than the solution proposed in WO-A-97/19382: indeed, it makes it possible to take account of the optical properties of the lens as effectively experienced by the wearer, and not only algebraic calculation which of necessity is approximate.

It is clear that in all these examples, one can readily reverse the role of the front and rear surfaces. One can also distribute power, torus and progression at will over one or the other of the two lens surfaces, or partly on one surface and partly on the other. In the case of progressive lenses, a plane lens having the same power addition can be used as a target, as in example 1; one can just as well use a progressive lens having a power equivalent to the power prescribed.

Obviously, it is possible to employ other methods of optimization, and other ways of representing surfaces differing from the method proposed and the representations in terms of wave surfaces decomposed into Zernike polynomials.

What is claimed is:

1. A method for determining, by optimization, an ophthalmic lens for a spectacle wearer for whom an astigmatism has been prescribed, comprising the steps of:
   selecting a starting lens and defining a working lens to be equal to the starting lens;
   selecting a reference lens adapted for a wearer for whom no astignatism was prescribed;
   modifying the working lens, in order to minimize, in a plurality of directions of glance and in a reference frame associated with the eye:
   a difference in modulus between residual astigmatism of said working lens and astigmatism of the reference lens;
   residual astigmatism being defined as the difference between an astigmatism prescribed and astigmatism generated by the working lens in the reference frame associated with the eye, and for each direction of glance.

2. The method according to claim 1, in which power, astigmatism and residual astigmatism are calculated by ray tracing.

3. The method according to claim 1, wherein prescribed astigmatism is represented by expansion $(A_3, A_4, A_5)$ thereof into Zernike polynomials, and in which in each direction of glance, the wave surface generated by the working lens is represented by the (expansion $(a'_3, a'_4, a'_5)$ thereof into Zernike polynomials, and wherein modulus of residual astigmatism in said direction of glance is equal to $4\sqrt{(a'_3-A_3)^2+(a'_5-A_5)^2}$.

4. The method according to claim 1, wherein, in each direction of glance, a wave surface generated by said working lens is represented by expansion $(a'_3, a'_4, a'_5)$ thereof into Zernike polynomials, and wherein power in said direction of glance is equal to $4a'_4$.

5. The method according to claim 1, wherein said ophthalmic lens is a progressive lens.

6. The method according to claim 1, wherein said ophthalmic lens is a lens dedicated to near vision.

7. The method according to claim 1, in which an orientation of the reference frame associated with the eye in a direction of glance $(\alpha, \beta)$ is deduced from orientation of the reference frame in the direction $\alpha=\beta=0$ by means of Listing's law.

8. The method according to claim 1, wherein the said target lens is a spherical lens.

9. The method according to claim 1, wherein the said step of modifying the working lens is iterated in order to cause said differences to decrease.

10. The method according to claim 1, wherein the step of modifying the working lens comprises modifying one single surface thereof.

11. A lens obtained by the method according to claim 1.

12. A lens according to claim 11, the surface of which is toric or spherical.

13. The method according to claim 2 wherein prescribed astigmatism is represented by expansion $(A_3, A_4, A_5)$ thereof into Zernike polynomials, and in which, in each direction of glance, the wave surface generated by the working lens is represented by the expansion $(a'_3, a'_4, a'_5)$ thereof into Zernike polynomials, and wherein amplitude of residual astigmatism in said direction of glance is equal to $4\sqrt{(a'_3-A_3)^2+(a'_5-A_5)^2}$.

14. The method according claim 2 wherein, in each direction of glance, a wave surface generated by said working lens is represented by expansion $(a'_3, a'_4, a'_5)$ thereof into Zernike polynomials, and wherein power in said direction of glance is equal to $4a'_4$.

15. The method according claim 3 wherein, in each direction of glance, a wave surface generated by said working lens is represented by expansion $(a'_3, a'_4, a'_5)$ thereof into Zernike polynomials, and wherein power in said direction of glance is equal to $4a'_4$.

16. The method according claim 13 wherein, in each direction of glance, a wave surface generated by said working lens is represented by expansion $(a'_3, a'_4, a'_5)$ thereof into Zernike polynomials, and wherein power in said direction of glance is equal to $4a'_4$.

17. The method according to claim 1, wherein the step of modifying is further carried out in order to minimize, in a plurality of directions of glance and in a reference frame associated with the eye:
   a difference between a power of said working lens and a power of said reference lens.

18. The method according to claim 1, wherein the step of modifying is further carried out in order to minimize, in a plurality of directions of glance and in a reference frame associated with the eye:
   a difference in axis between residual astigmatism of said working lens and astigmatism of the reference lens.

* * * * *

UNITED STATES PATENT AND TRADEMARK OFFICE
CERTIFICATE OF CORRECTION

PATENT NO.    : 6,382,789 B1
DATED         : May 7, 2002
INVENTOR(S)   : Thierry Baudart and Gilles Le Saux It is certified that error appears in the above-identified patent and that said Letters Patent is hereby corrected as shown below:

Column 4,
Line 32, replace the equation with -- $4\sqrt{(a'_3 - A_3)^2 + (a'_5 - A_5)^2}$. --

Column 7,
Line 15, replace the equation with -- $4\sqrt{a_3^2 + a_5^2}$ --

Line 52, replace "applicants" with -- applicant's --.
Line 62, replace the equation with --
$$4a'_4 = 4a_4$$
$$4\sqrt{(a'_3 - A_3)^2 + (a'_5 - A_5)^2} = 4\sqrt{a_3^2 + a_5^2}$$
--

Column 8,
Line 22, replace the equation with -- $4\sqrt{(a'_3 - A_3)^2 + (a'_5 - A_5)^2} = 0$ --

Column 9,
Line 22, replace "astigmatism' or" with -- astigmatism or --.
Lines 61-62, replace "The working lens has, in the direction of glance corresponding to point i, a current power value of" with -- The working lens is defined, in the directions of glance corresponding to the points i selected, by the sets of three coefficients (a'$_1$, a'$_2$, a'$_3$). For each point i, a current power value of --.

Column 10,
Line 1, replace the equation with -- $V_{i2} = 4\sqrt{(a'_3 - A_3)^2 + (a'_5 - A'_5)^2}$ --

Column 12,
Line 17, replace "ccording" with -- according --.

UNITED STATES PATENT AND TRADEMARK OFFICE
CERTIFICATE OF CORRECTION

PATENT NO.    : 6,382,789 B1
DATED         : May 7, 2002
INVENTOR(S)   : Thierry Baudart and Gilles Le Saux It is certified that error appears in the above-identified patent and that said Letters Patent is hereby corrected as shown below:

<u>Column 13,</u>
Line 47, replace "(expansion)" with -- expansion --.

Signed and Sealed this

Twenty-fifth Day of February, 2003

JAMES E. ROGAN
*Director of the United States Patent and Trademark Office*